US 8,775,695 B2

(12) United States Patent
Kanaya et al.

(10) Patent No.: US 8,775,695 B2
(45) Date of Patent: Jul. 8, 2014

(54) SPECIFIC IDENTIFICATION INFORMATION MANAGEMENT DEVICE, INFORMATION PROCESSING DEVICE, AND SPECIFIC IDENTIFICATION INFORMATION SETTING METHOD

(75) Inventors: Manabu Kanaya, Kawasaki (JP); Yukio Oguma, Kawasaki (JP)

(73) Assignee: Fujitsu Limited, Kawsaki (JP)

( * ) Notice: Subject to any disclaimer, the term of this patent is extended or adjusted under 35 U.S.C. 154(b) by 87 days.

(21) Appl. No.: 13/137,860

(22) Filed: Sep. 19, 2011

(65) Prior Publication Data
US 2012/0011288 A1    Jan. 12, 2012

Related U.S. Application Data

(63) Continuation of application No. PCT/JP2009/001512, filed on Mar. 31, 2009.

(51) Int. Cl.
G06F 3/00    (2006.01)
G06F 5/00    (2006.01)

(52) U.S. Cl.
USPC ........................................... 710/36; 709/228

(58) Field of Classification Search
USPC ........................................................ 710/36
See application file for complete search history.

(56) References Cited

U.S. PATENT DOCUMENTS

| | | | |
|---|---|---|---|
| 6,804,727 B1 * | 10/2004 | Rademacher | 710/9 |
| 6,981,080 B2 * | 12/2005 | Thompson et al. | 710/104 |
| 7,234,061 B1 * | 6/2007 | Diab et al. | 713/176 |
| 7,809,977 B2 * | 10/2010 | Takamoto | 714/5.11 |
| 8,112,769 B2 * | 2/2012 | Fuchs et al. | 719/327 |
| 2008/0313362 A1 | 12/2008 | Takamoto | |

FOREIGN PATENT DOCUMENTS

| | | |
|---|---|---|
| JP | 10-336208 | 12/1998 |
| JP | 2002-126310 | 5/2002 |
| JP | 2003-87252 | 3/2003 |
| JP | 2005-202774 | 7/2005 |
| JP | 2007-148978 | 6/2007 |
| JP | 2008-15865 | 1/2008 |
| JP | 2008-310489 | 12/2008 |

OTHER PUBLICATIONS

International Search Report for PCT/JP2009/001512 mailed Jul. 7, 2009.
Japanese Office Action issued Jul. 10, 2012 in corresponding Japanese Patent Application No. 2011-506847.

* cited by examiner

Primary Examiner — Elias Mamo
(74) Attorney, Agent, or Firm — Staas & Halsey LLP

(57) ABSTRACT

A specific identification information management device coupled to a feature expansion device includes: a storage unit configured to store the specific identification information of the feature expansion device; a detection unit configured to detect access to the feature expansion device; and a control unit configured to transmit the specific identification information stored in the storage unit to the source of access to the feature expansion device when the access is detected by the detection unit.

8 Claims, 32 Drawing Sheets

SPECIFIC IDENTIFICATION INFORMATION MANAGEMENT DEVICE, INFORMATION PROCESSING DEVICE, AND SPECIFIC IDENTIFICATION INFORMATION SETTING METHOD

CROSS-REFERENCE TO RELATED APPLICATIONS

This application is a continuation application of International Application JP2009/001512 filed on Mar. 31, 2009 and designated the U.S., the entire contents of which are incorporated herein by reference.

FIELD

The embodiments discussed herein are related to a specific identification information management device for managing the specific identification information about the feature expansion device loaded into an information processing device.

BACKGROUND

One of the functions of the operating system (OS) is to confirm the configuration information about a device for which the OS is operated. The current information about the device (current device information) is compared with the preset information about the device (preset information) to confirm whether or not a matching result is obtained. If the current device information does not the preset information, for example, there is the possibility that the device cannot be activated or the device cannot be connected to a network. The configuration about the configuration information is intended for security, and unintended device replacement (for example, a theft etc.) can be checked by confirming the configuration information.

The information about a device can be a media access control (MAC) address which is the specific identification information about a network interface card (NIC) as a feature expansion device for expanding a network function.

FIGS. 1 through 8 illustrate the outline of the conventional MAC address managing method.

A server 101 as an information processing device includes a partition 102, a system management device (SMD) 103, and a back plane (BP) 104.

An OS 105 is installed on the server 101.

The partition 102 includes an I/O unit (IOU) 106-$i$ ($i$=1, 2).

The IOU 106-$i$ includes an I/O controller hub (ICH) 107-$i$, the NIC 108-$i$-$j$ ($j$=1, 2).

The ICH 107 provides an interface such as a peripheral component interconnect (PCI) bus, a universal serial bus (USB), and a local area network (LAN), etc.

The NIC 108 is a feature expansion card connected to a network for performing communications, and is connected to the ICH 107.

The SMD 103 is a device for managing the server 101, and stores partition information. The partition information includes the MAC address of the NIC 108.

The BP 104 is a circuit substrate provided with a connector for connection of the IOU 106 and the SMD 103. The IOU 106 and the SMD 103 are connected to the BP 104 to configure the server 101.

Described below is the flow of the management of the MAC address after the power-on of the partition 102.

After the power-on of the partition 102, the SMD 103 reads the MAC address from the NIC 108 during the power-on sequence, and stores the address in the SMD 103 (FIG. 1).

After the boot of the OS 105, the MAC address is set by the preset of the OS 105. One of the functions of the OS 105 is to confirm the configuration information intended for security. During the operation, the OS 105 accesses the NIC 108, reads a MAC address, and confirms the configuration information (FIG. 2).

When a hardware error occurs during the operation, and if it is an error of a NIC, then it is common to replace the NIC while continuing the operation (FIG. 3).

After the power-on of newly replacing hardware, the SMD 103 reads the MAC address from the new NIC 108-2-3 to update the partition information (FIG. 4).

The OS 105 accesses the new NIC 108-2-3 and reads the MAC address. Then, it compares the read MAC address with the preset MAC address. Since the read MAC address does not match the preset MAC address, for example, the server may be inoperative, or data cannot be transferred to the NIC (FIG. 5).

When the IOU 106 becomes faulty, it can be considered that the operation continues using a dynamic reconfiguration (DR) function (FIG. 6).

After the power-on of the newly replacing hardware, the SMD 103 reads the MAC address from the new NICs 108-3-1 and 108-3-2 to update the partition information (FIG. 7).

The OS 105 accesses the new NICs 108-3-1 and 108-3-2, and reads the MAC address. Then, it compares the read MAC address with the preset MAC address. Since the read MAC address does not match the preset MAC address, for example, the server may be inoperative, or data cannot be transferred to the NIC (FIG. 8).

To avoid the situation above, it is necessary to reset the MAC address for the OS when hardware is replaced.

As described above, when hardware is replaced due to a fault etc., the MAC address is changed. Therefore, an error can be indicated by the confirmation of the configuration information, thereby disabling the server to be used or the network to be accessed.

Thus, there has been the problem that it is necessary to reset the configuration information for the OS.

Also known is the technique of setting the physical address of the communication device before the replacement as the physical address of a new communication device after replacing the communication device with a new communication device.

[Patent Document 1] Japanese Laid-open Patent Publication No. 2007-148978

SUMMARY

According to an aspect of the invention, a specific identification information management device coupled to a feature expansion device, the specific identification information management device includes: a storage unit configured to store the specific identification information of the feature expansion device; a detection unit configured to detect access to the feature expansion device; and a control unit configured to transmit the specific identification information stored in the storage unit to the source of access to the feature expansion device when the access is detected by the detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiment of the present invention is described below with reference to the attached drawings.

FIGS. 9 through 15 illustrate the outline of the MAC address managing method according to the first embodiment.

A server 201 as an information processing device includes a partition 202, a system management device (SMD) 203, and a back plane (BP) 204.

An OS 205 is installed on the server 201.

The partition 202 includes an IOU 206-$i$ ($i$=1, 2).

The IOU 206-$i$ includes an ICH 207-$i$, a NIC 208-$i$-$j$ ($j$=1, 2), and a MAC address management device (MMD) 209-$i$.

The ICH 207 provides an interface such as a PCI bus, a USB, a LAN, etc.

The NIC 208 is an expansion card connected to a network for performing communications, and is connected to the ICH 207.

A MAC address management device 209 holds a MAC address, and transmits the held MAC address to the OS 105 in response to the access of the OS 205 to the NIC 208.

The system management device 203 is a device for managing the server 201, and stored partition information. The partition information includes the MAC address of the NIC 208.

The BP 204 is a circuit substrate provided with a connector for connection of the IOU 206, the system management device 203, etc. The IOU 206 and the system management device 203 are connected to the BP 204, and configure the server 201.

Described below is the procedure from the power-on.

Figure 1:
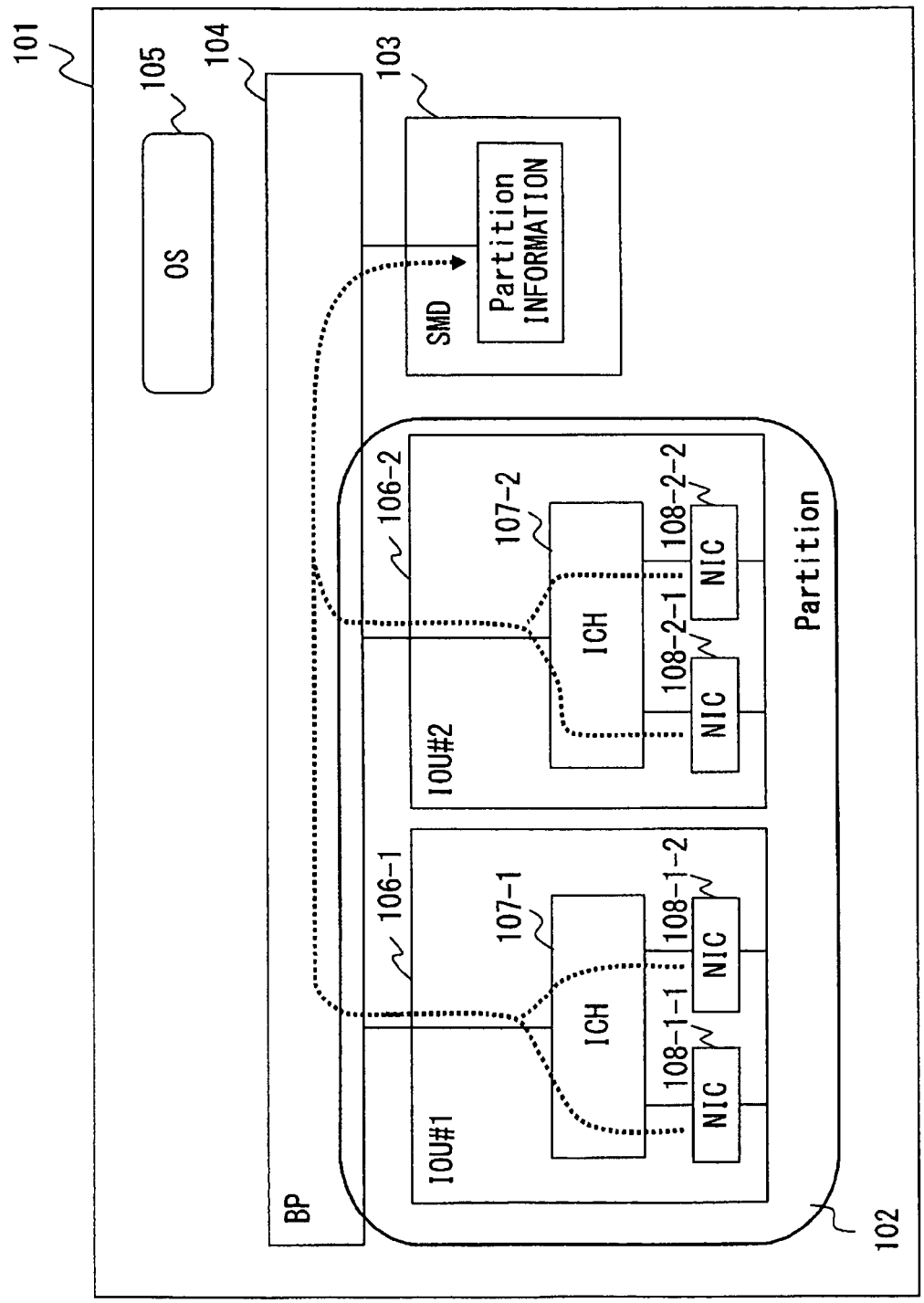
FIG. 1 illustrates the outline of the conventional MAC address managing method.
Figure 2:
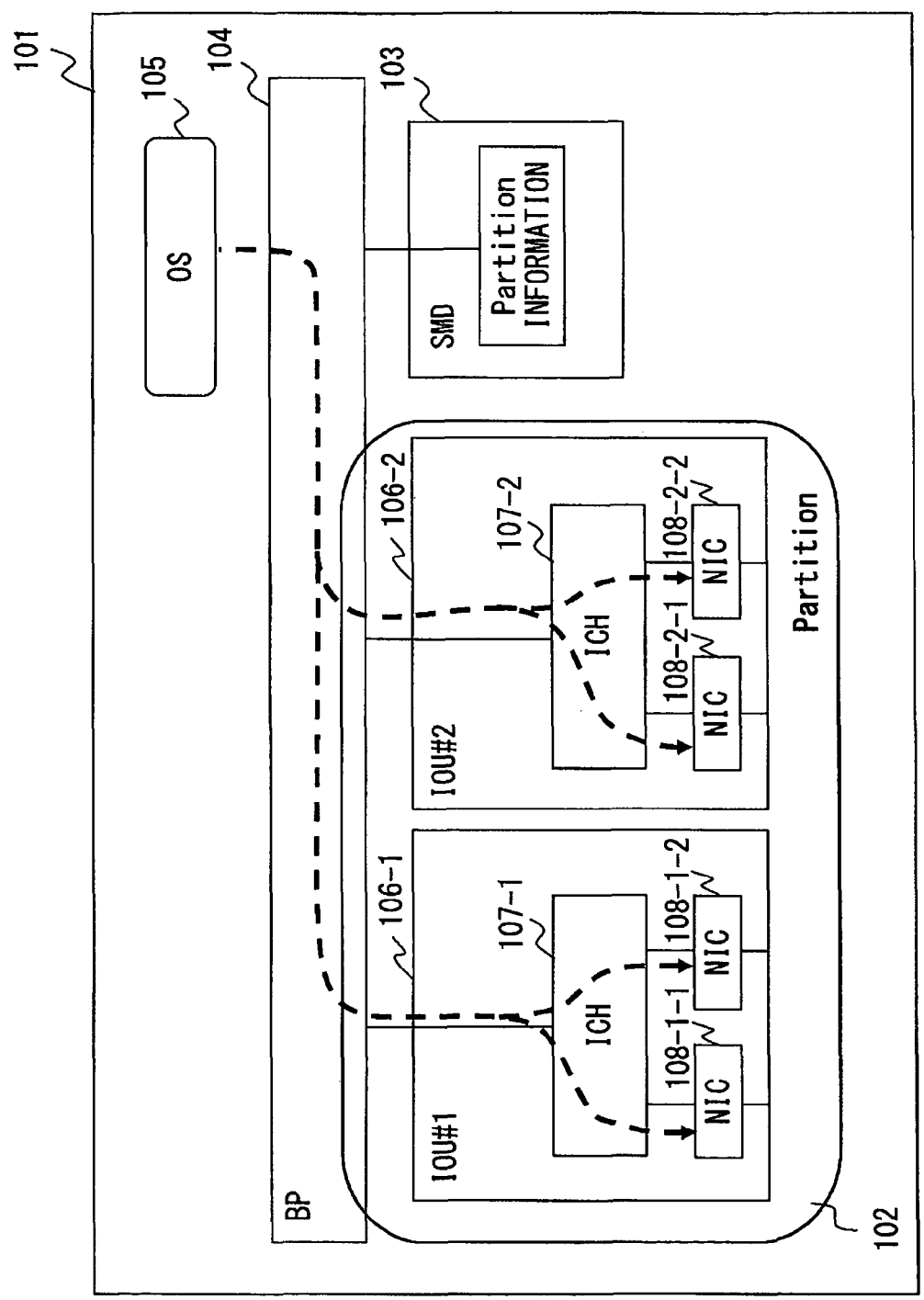
FIG. 2 illustrates the outline of the conventional MAC address managing method.
Figure 3:
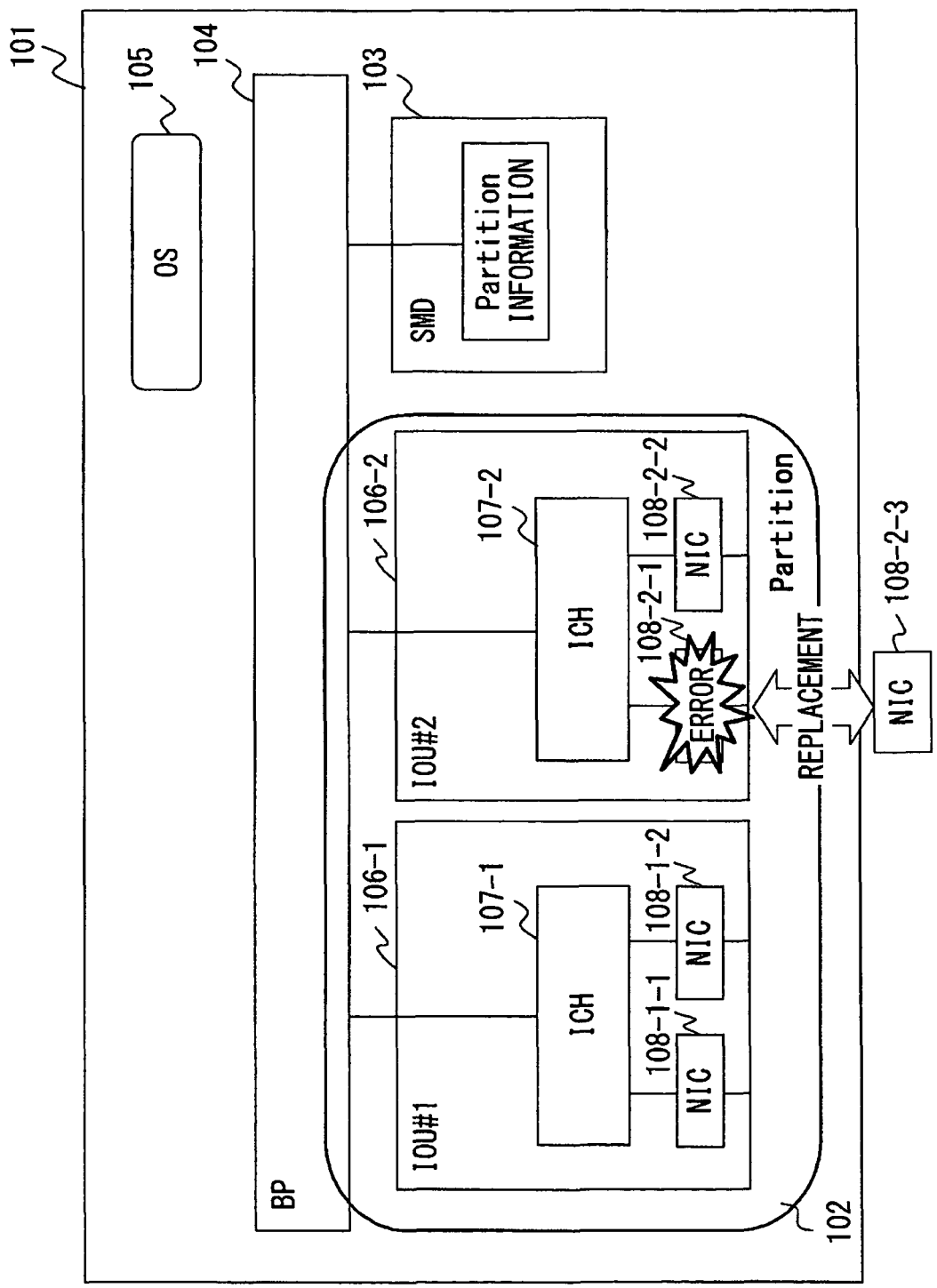
FIG. 3 illustrates the outline of the conventional MAC address managing method.
Figure 4:
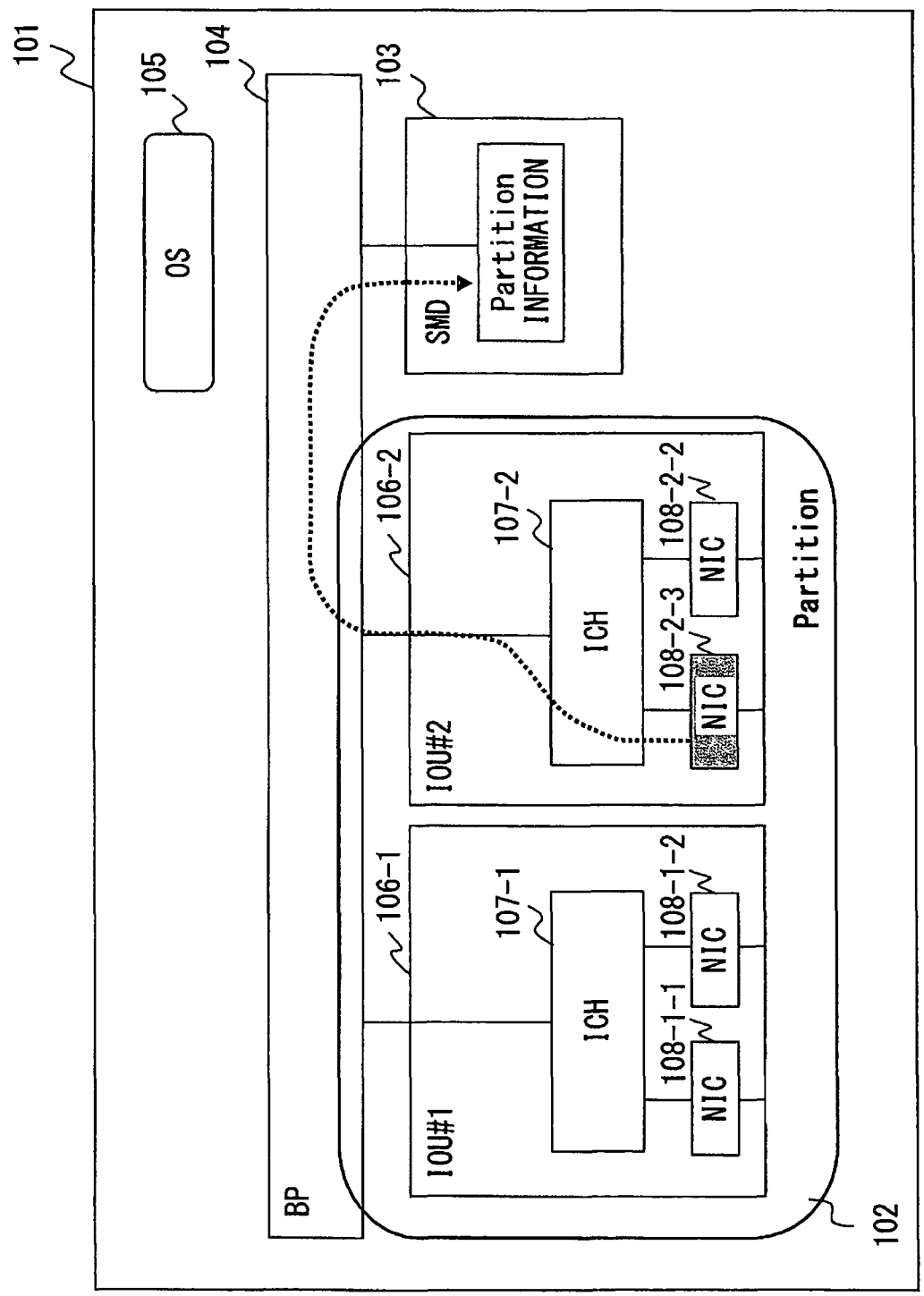
FIG. 4 illustrates the outline of the conventional MAC address managing method.
Figure 5:
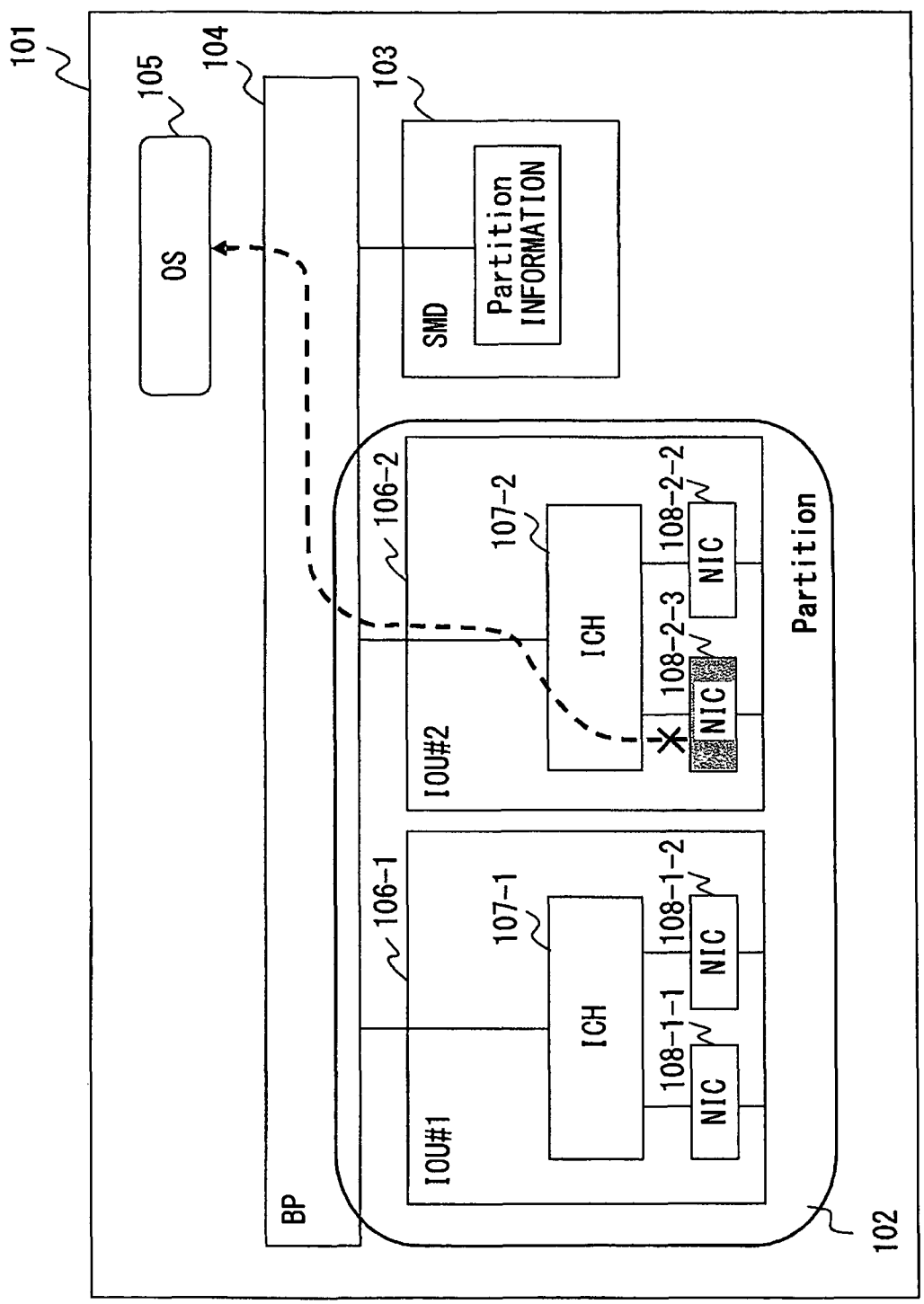
FIG. 5 illustrates the outline of the conventional MAC address managing method.
Figure 6:
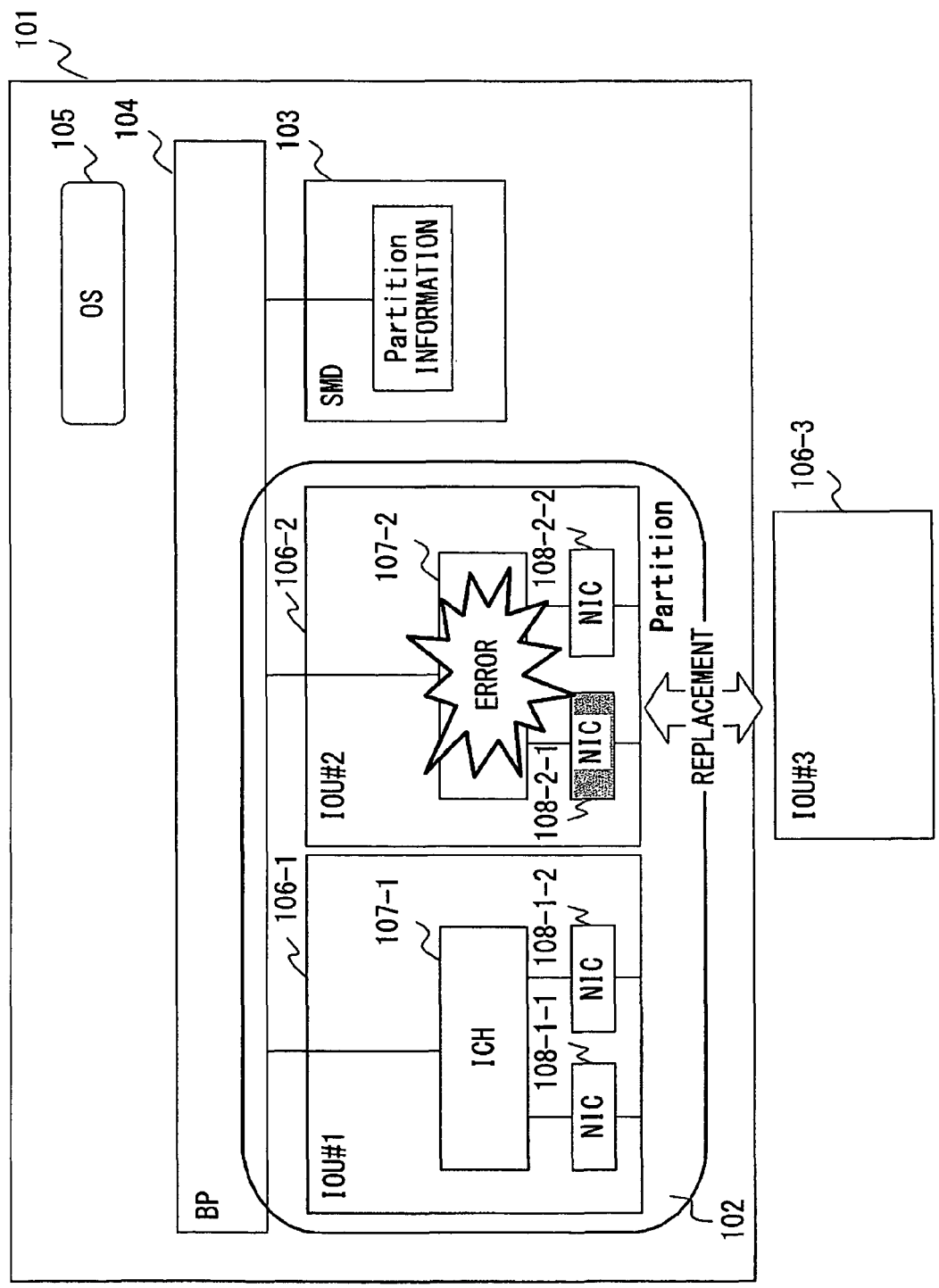
FIG. 6 illustrates the outline of the conventional MAC address managing method.
Figure 7:
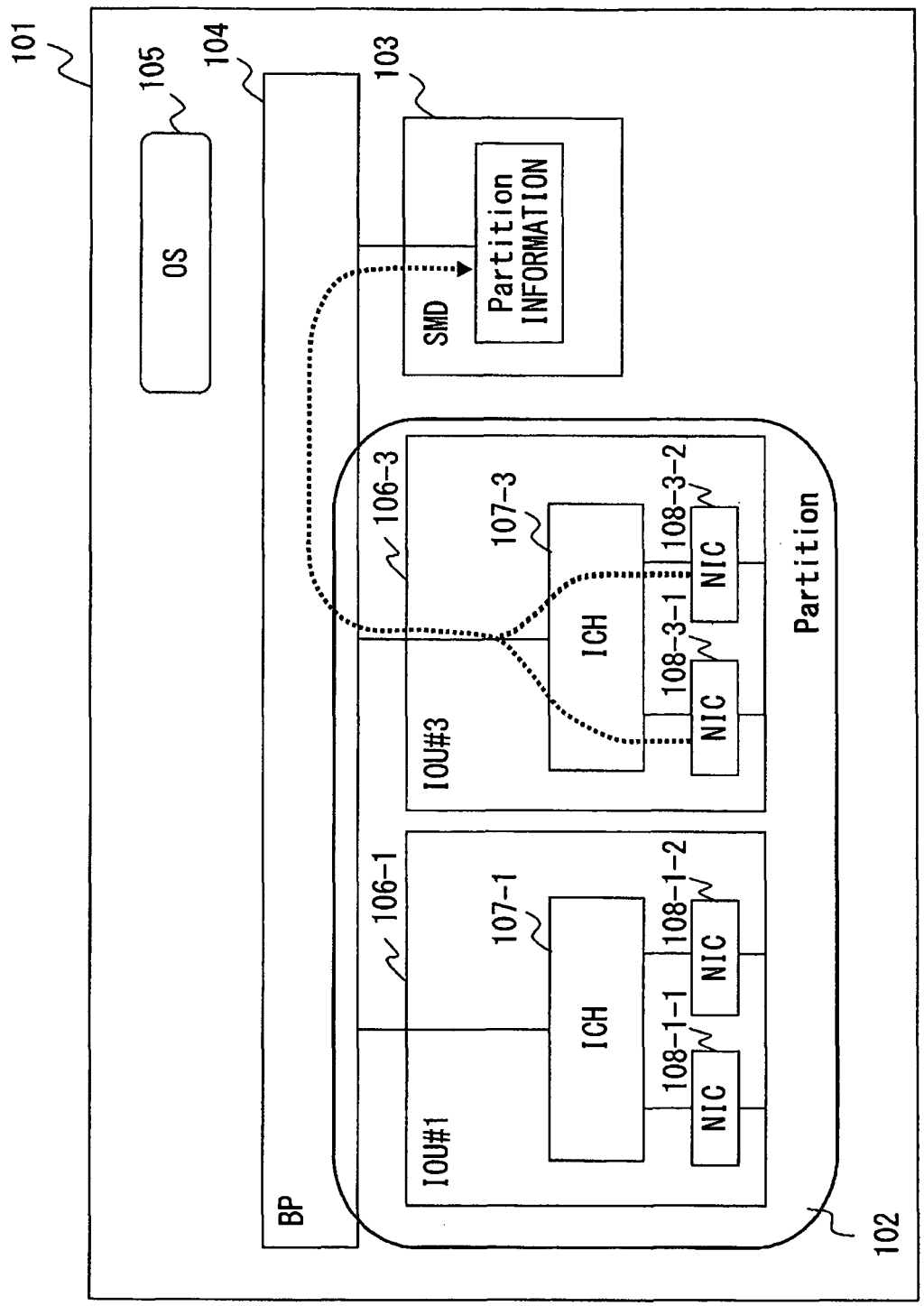
FIG. 7 illustrates the outline of the conventional MAC address managing method.
Figure 8:
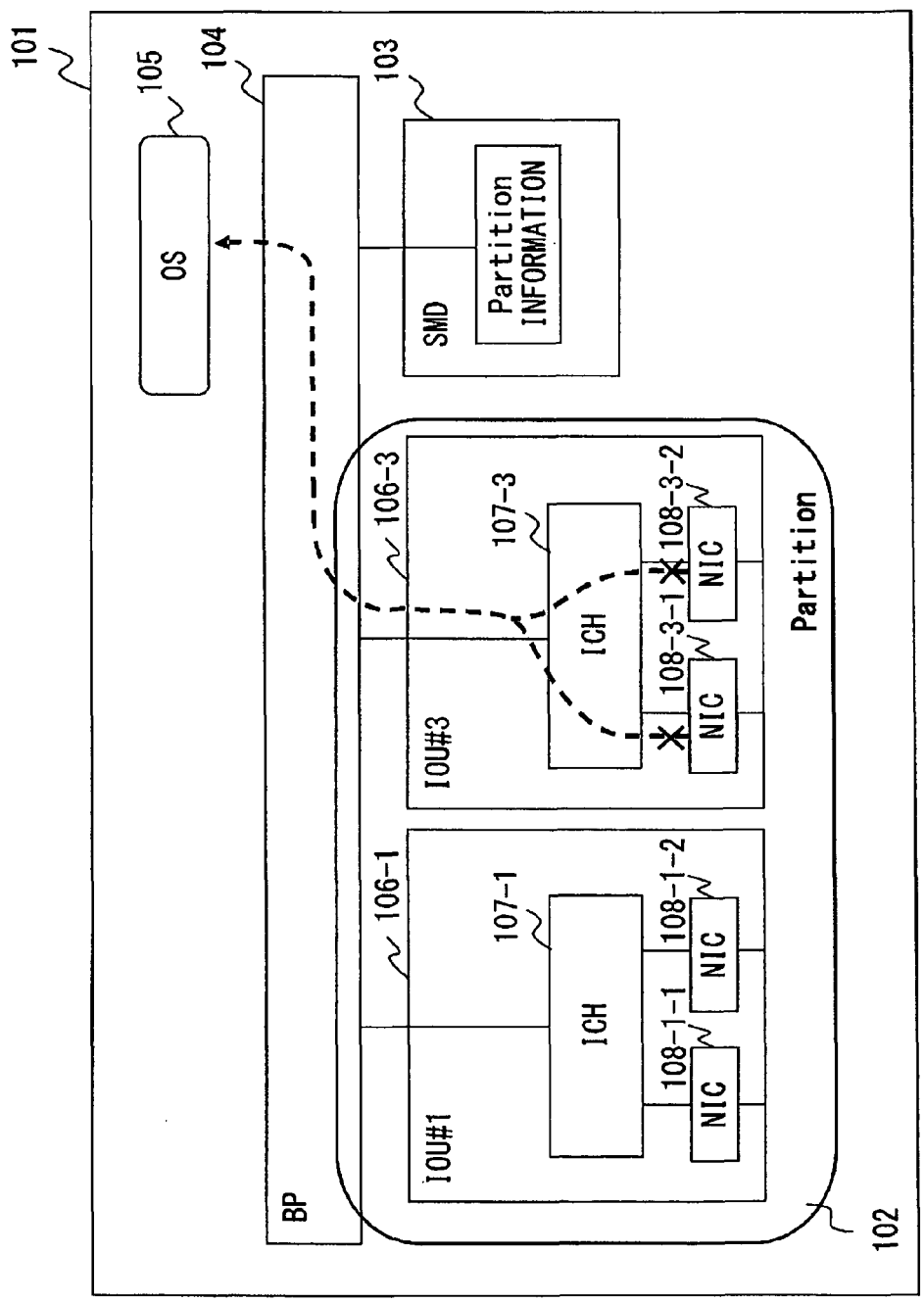
FIG. 8 illustrates the outline of the conventional MAC address managing method.
Figure 9:
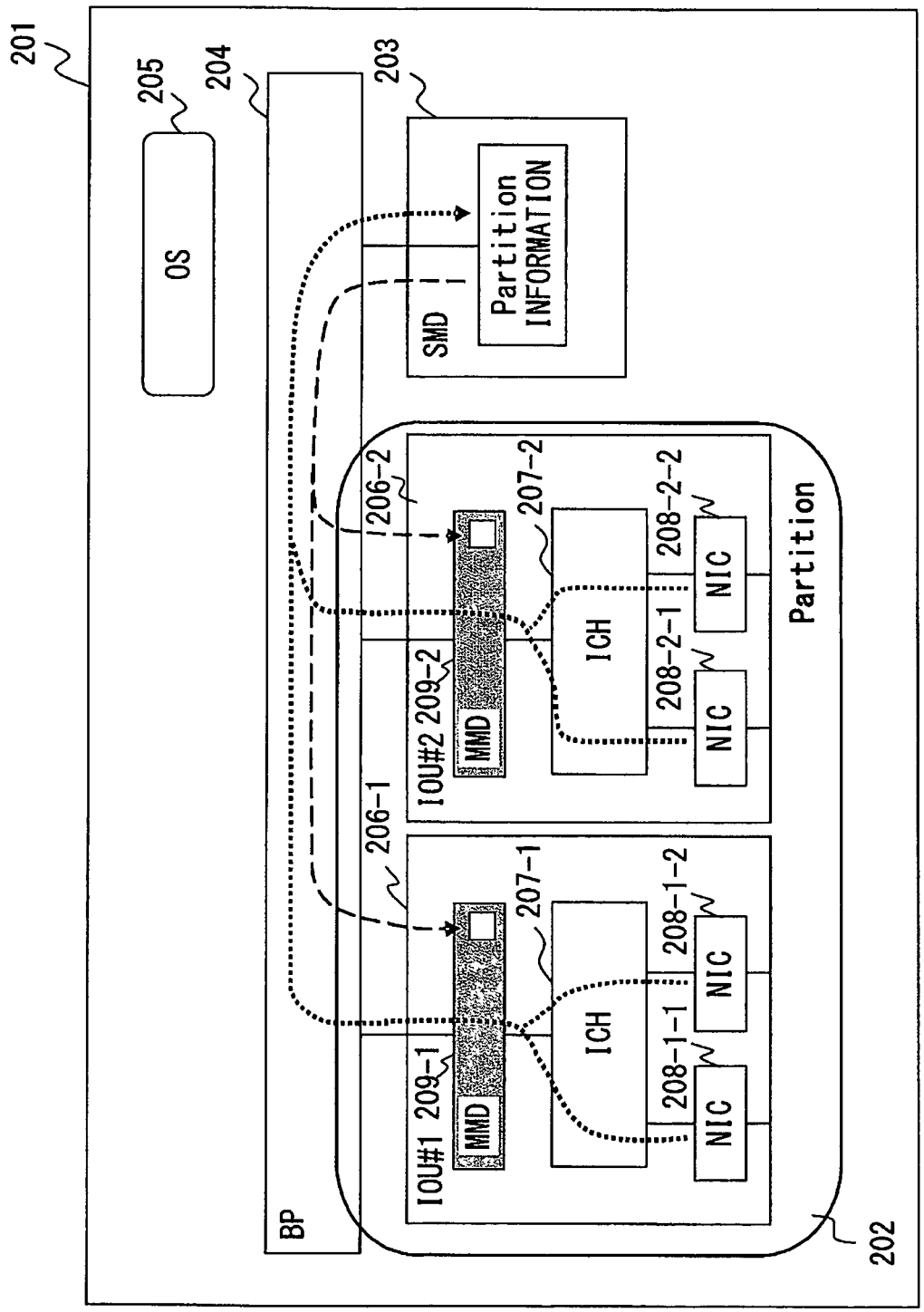
FIG. 9 illustrates the outline of the MAC address managing method according to the first embodiment.

After the power-on of a partition, the system management device 203 reads the MAC address from the NIC 208 to hold the partition information during the power-on sequence as the activating sequence at power-on. Then, the system management device 203 writes the read MAC address to the MAC address management device 209 (FIG. 9).

Figure 10:
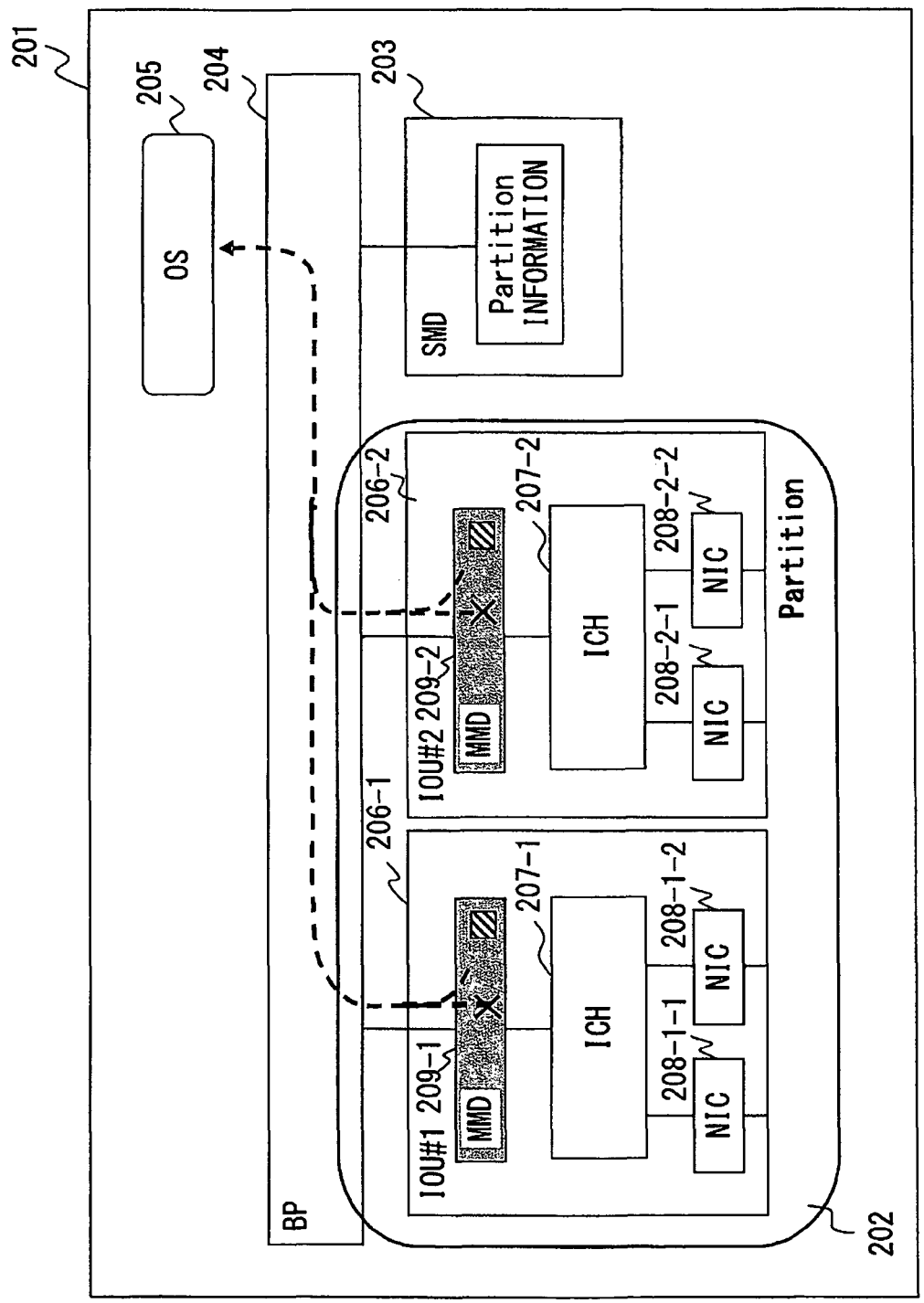
FIG. 10 illustrates the outline of the MAC address managing method according to the first embodiment.

After the boot of the OS 205, a MAC address is set when the OS 205 performs the preset. During the operation, the OS 205 accesses the NIC 208 to read the MAC address, but the MAC address management device 209 detects the access and notifies the OS 105 of the MAC address held by the MAC address management device 209 (FIG. 10).

Figure 11:
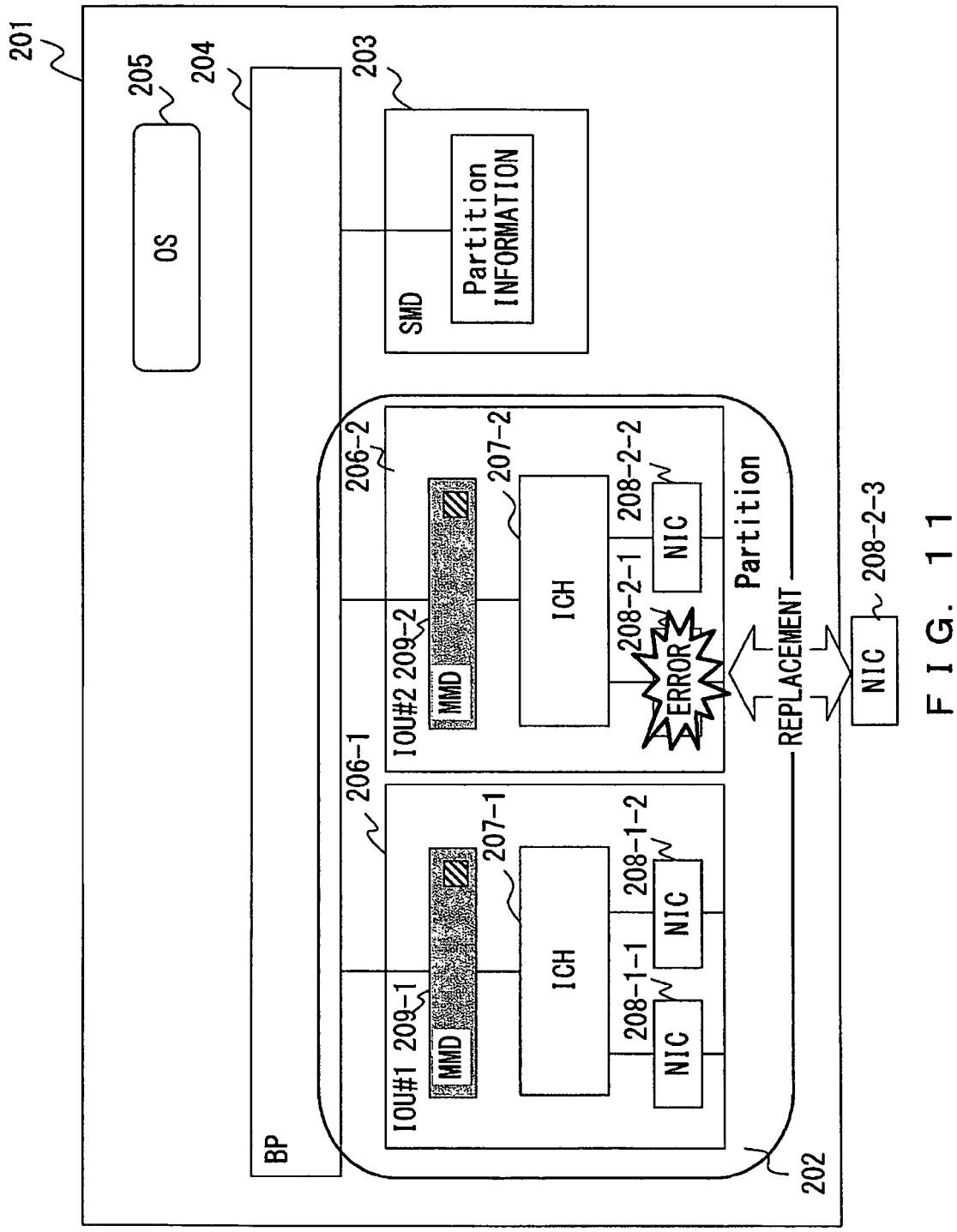
FIG. 11 illustrates the outline of the MAC address managing method according to the first embodiment.

When a hardware error occurs during the operation, and if the error is a fault of the NIC 208, it is common to replace the NIC while continuing the operation. In this example, it is assumed that a NIC 208-2-1 has become faulty, and is replaced with a NIC 208-2-3 (FIG. 11).

Figure 12:
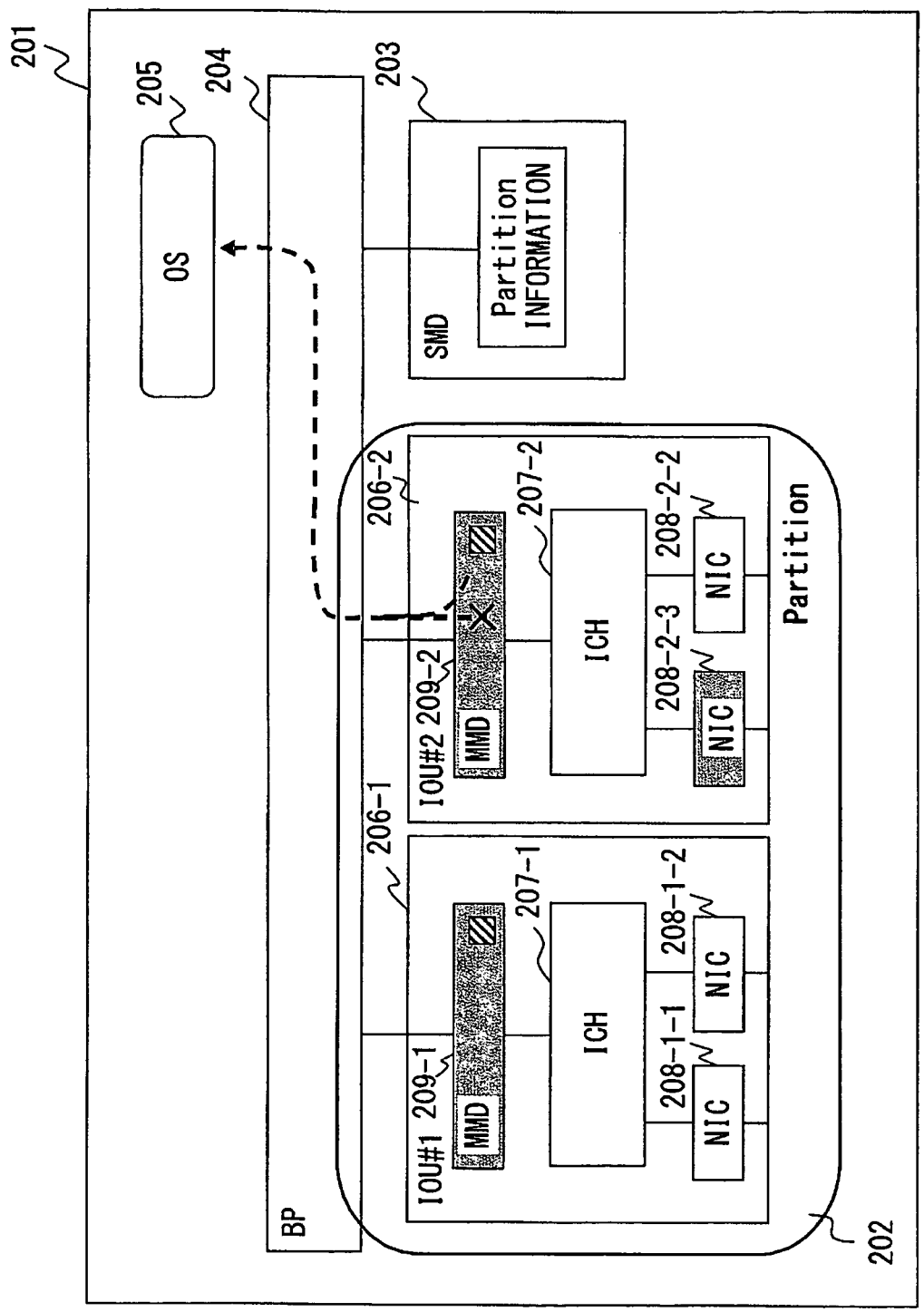
FIG. 12 illustrates the outline of the MAC address managing method according to the first embodiment.

In response to the access from the OS 205 to the new NIC 208-2-3 for a read of the MAC address after the replacement of the faulty NIC 208-2-1, the MAC address management device 209-2 notifies the OS 205 of the MAC address of the NIC 208-2-1 held in the MAC address management device 209-2. Therefore, the OS is not conscious of the replacement of the NIC 208-2-1. Accordingly, it is not necessary to reset the OS (FIG. 12).

Figure 13:
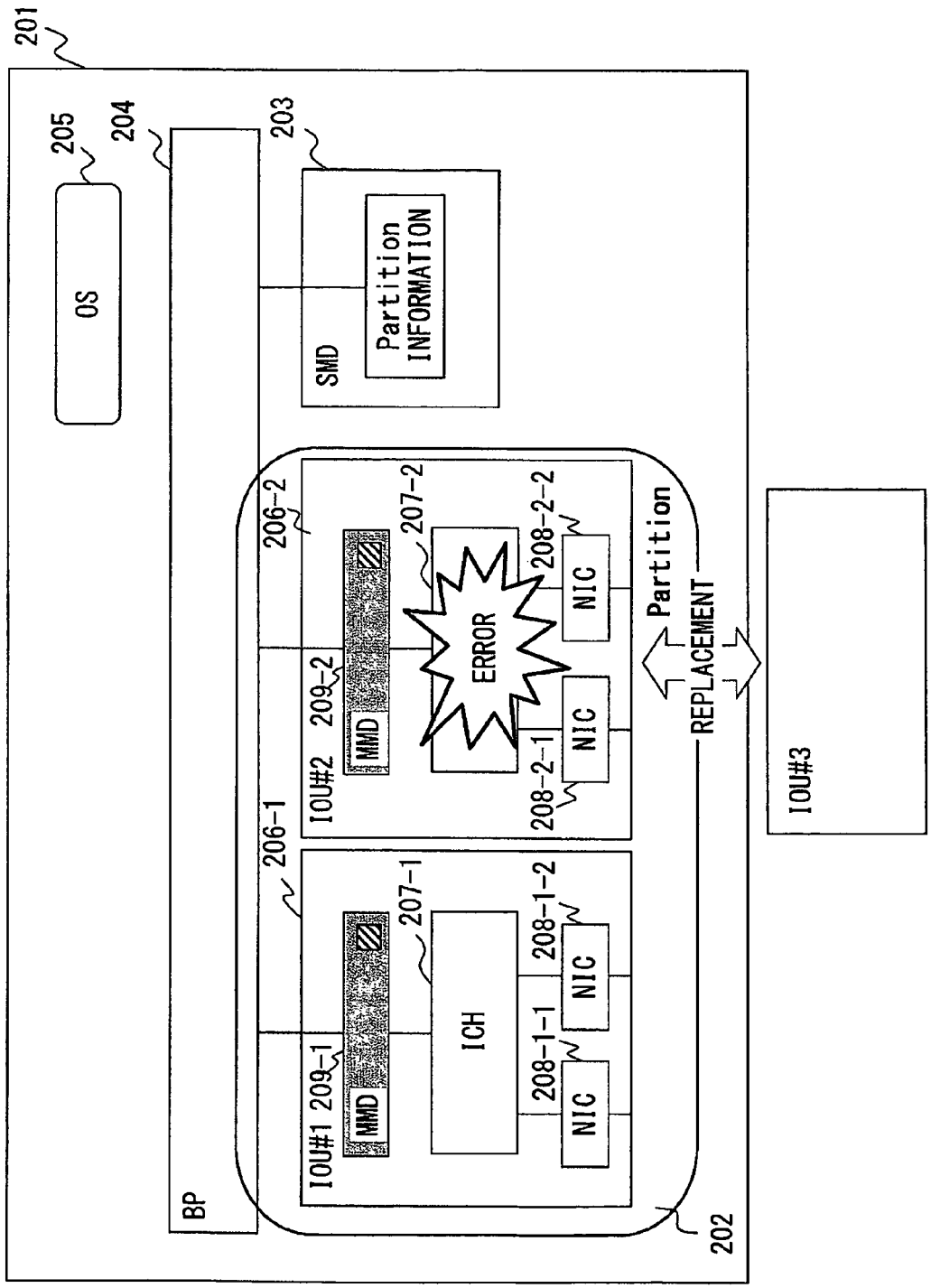
FIG. 13 illustrates the outline of the MAC address managing method according to the first embodiment.

When the hardware error during the operation refers to the IOU, it can be considered to continue to the operation using the DR function. In this example, it is assumed that a IOU 206-2 has become faulty and has been replaced with a IOU 206-3 (FIG. 13).

The IOU 206-3 includes a ICH 207-3, NICs 208-3-1 and 208-3-2, and a MAC address management device 209-3.

Figure 14:
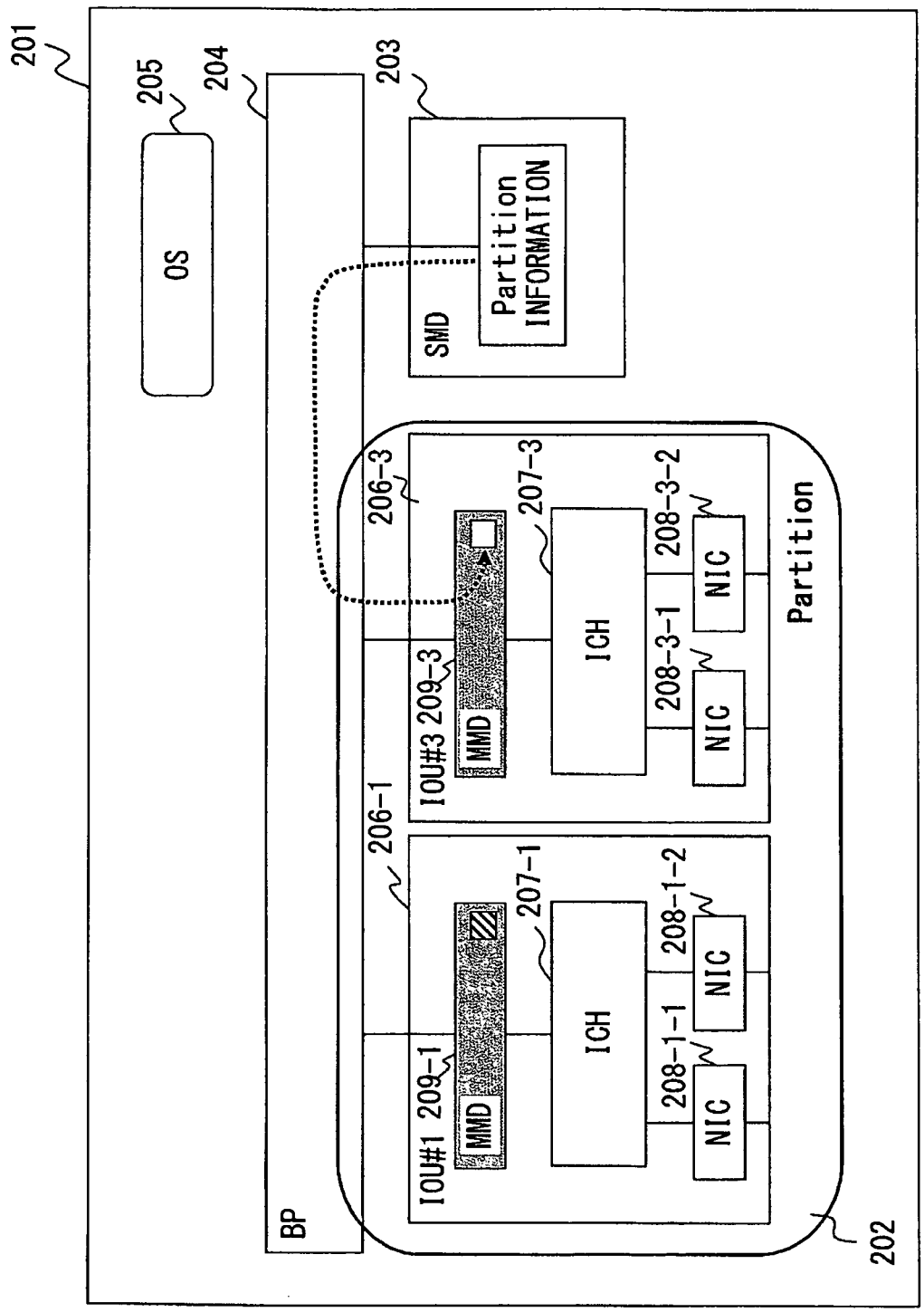
FIG. 14 illustrates the outline of the MAC address managing method according to the first embodiment.

After the power-on of the replacing IOU 206-3, the system management device 203 writes the held MAC address to the MAC address management device 209-3 of the IOU 206-3 (FIG. 14).

Figure 15:
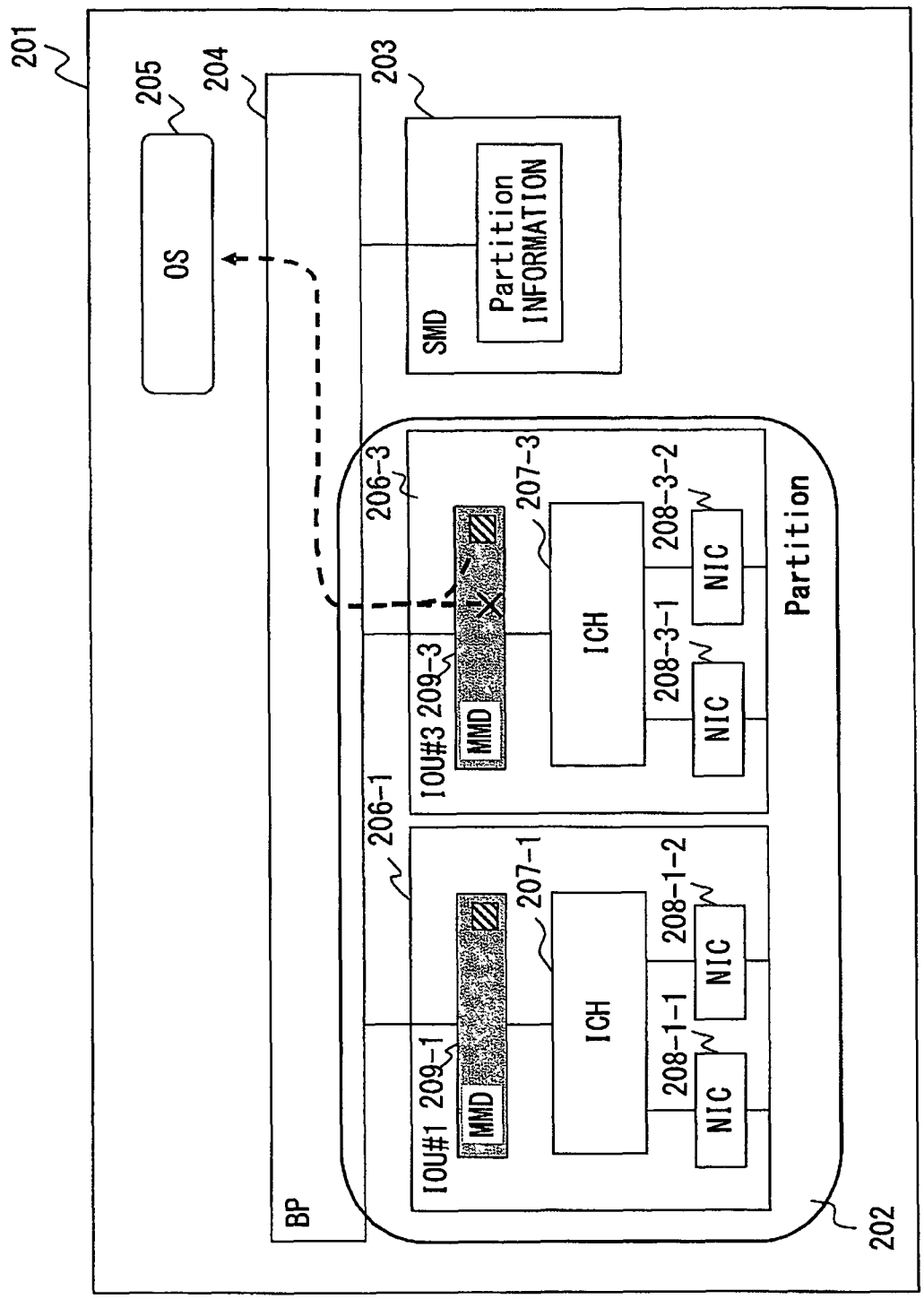
FIG. 15 illustrates the outline of the MAC address managing method according to the first embodiment.

After the replacement of the faulty IOU 206-2, the MAC address of the NIC 208-2-1 and 208-2-2 held in the MAC address management device 209-3 is notified to the OS 205 in response to the access from the OS 205 to the NICs 208-3-1 and 208-3-2. Therefore, the OS 205 is not conscious of the replacement of the IOU 206-2 and the NIC 208-2-1 and 208-2-2. Accordingly, it is not necessary to reset the OS 205 (FIG. 15).

As described above, it is not necessary to reset the MAC address.

Figure 16:
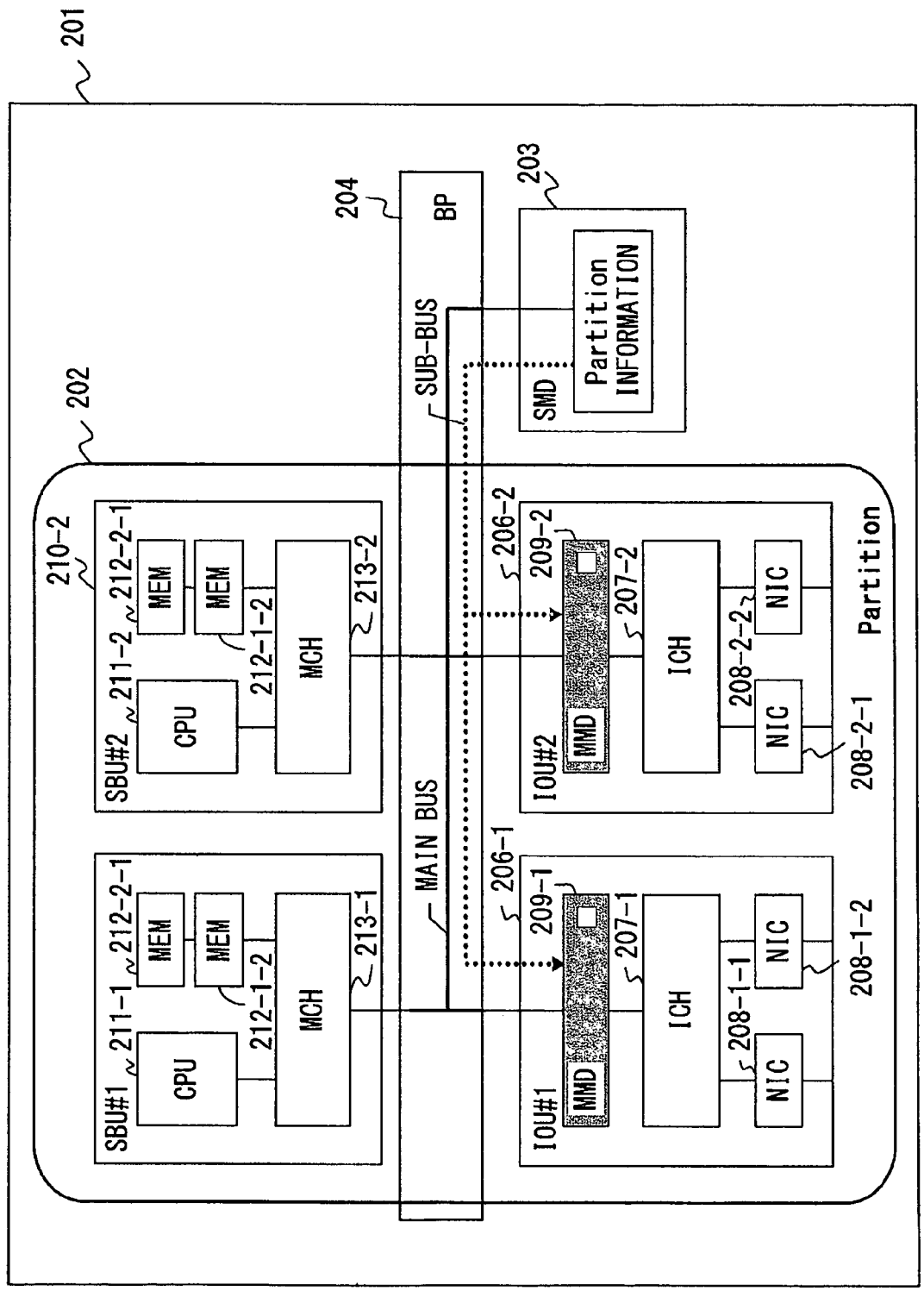
FIG. 16 is a configuration of the server according to the first and second embodiment.

FIG. 16 is a configuration of the server according to the first embodiment.

The server 201 includes the partition 202, the system management device (SMD) 203, and the back plane (BP) 204.

Furthermore, the OS 205 is installed on the server 201.

The partition 202 includes the IOU 206-$i$ ($i$=1, 2) and a system board unit (SBU) 210-$i$.

The IOU 206-$i$ includes the ICH 207-$i$, the NIC 208-$i$-$j$ ($j$=1, 2), and the MAC address management device 209-$i$.

The SBU 210-$i$ includes a central processing unit (CPU) 211-$i$, memory 212-$i$-$j$, and a memory controller hub (MCH) 213-$i$.

The CPU 211 performs various processes.

Memory 212 is a storage device for temporarily storing data processed by the CPU 211 etc.

The MCH 213 controls the memory 212.

Figure 17:
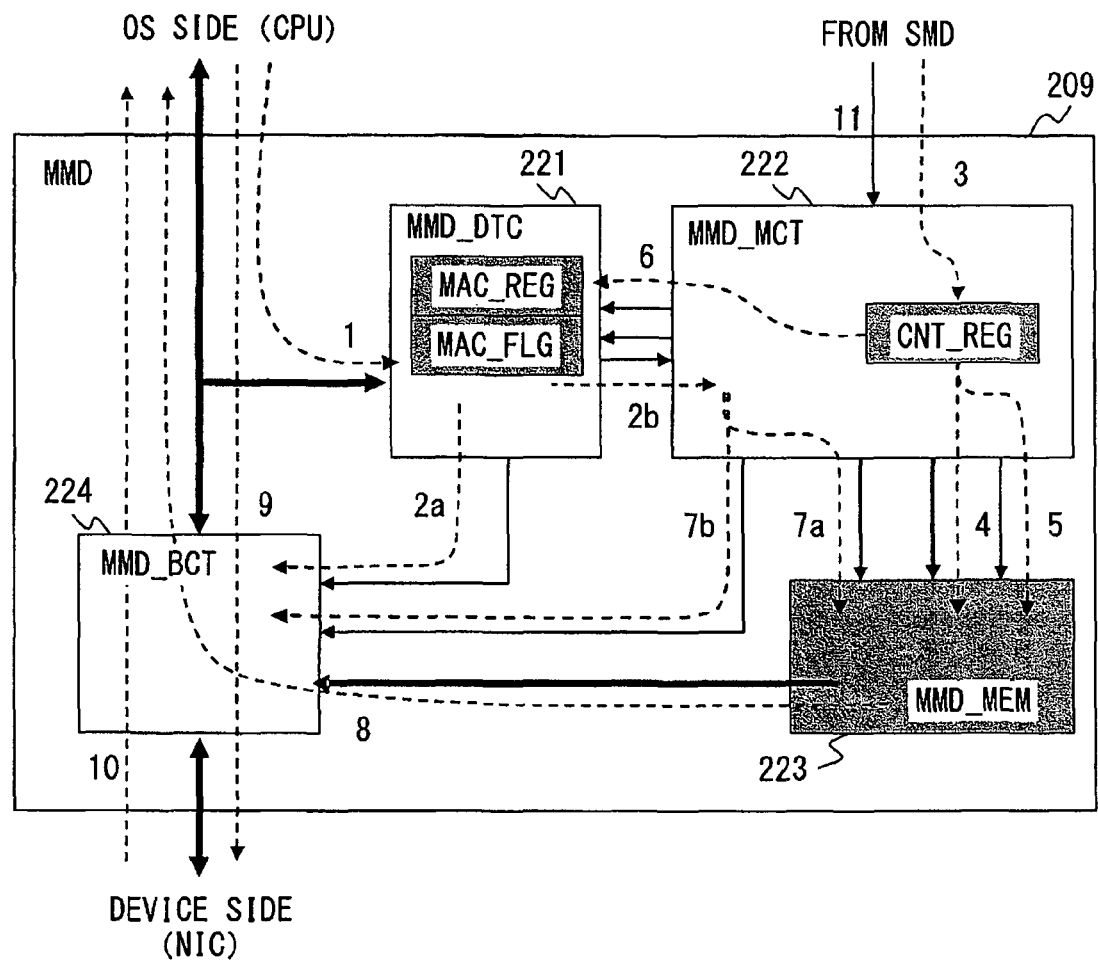
FIG. 17 is a configuration of the MAC address management device according to the first embodiment.

FIG. 17 is a detailed configuration of the MAC address management device.

The MAC address management device 209 includes an access detection unit (MEM_DCT) 221, memory control unit (MMD_MCT) 222, memory unit (MMD_MEM) 223, and a bus control unit (MMD_BCT) 224.

In FIG. 17, the arrow indicated by the solid lines illustrates the flow of data, and the arrow indicated by the dotted lines illustrates the flow of a control signal.

The access detection unit 221 monitors a bus and detects the access to the NIC.

The access detection unit 221 confirms the data hold state by a flag register (MAC_FLG) in the access detection unit 221.

The access detection unit 221 monitors a bus using the MAC detection data (MAC_REG) in the access detection unit 221.

The access detection unit 221 performs nothing in the MAC address non-hold state.

The access detection unit 221 outputs control signals 2a and 2b to the bus control unit 224 and the memory control unit 222 in the MAC address hold state.

The memory control unit 222 control a read and a write to the memory unit 223 according to the control signal.

The memory control unit 222 stores an instruction 3 received from the system management device 203 in a control register (CNT_REG), and performs the following process based on the instruction contents. When the instruction contents refer to a write of a MAC address, the memory control unit 222 also receives a MAC address 11 to be written to the memory unit 223.

Instruction to Write a MAC Address

When the instruction contents refer to a write of a MAC address, the memory control unit 222 transmits write data (MAC address) 4 and a write control signal 5 to the memory unit 223. Simultaneously, the memory control unit 222 outputs an instruction 6 to set the MAC detection data (MAC_REG) and the flag register (MAC_FLG) of the access detection unit 221. Thus, the MAC address management device 209 enters the MAC address hold state.

Instruction to Clear a MAC Address

When the instruction contents refer to clear of a MAC address, the memory control unit 222 outputs an instruction 6 to reset the flag register (MAC_FLG) of the access detection unit 221. Since the MAC address management device 209 determines the hold and the non-hold states of the MAC address by the status of the flag register, the MAC address non-hold state can be set by resetting the flag register without clearing the data of the memory unit 223.

Thus, the MAC address management device 209 enters the MAC address non-hold state.

In addition, when the control signal 2b from the access detection unit 221 indicates the enable state (access-to-NIC detected state), the memory control unit 222 transmits a read control signal 7a to the memory unit 223, and simultaneously transmits a read control signal 7b to the bus control unit 224.

The memory unit 223 stores an MAC address, and writes and reads data (MAC address) according to a control signal.

The memory unit 223 holds the write data 4 according to the write control signal 5.

The memory unit 223 transmits held data 8 to the bus control unit 224 according to the read control signal 7a.

The bus control unit 224 cuts off a bus or transmits data to the bus according to a control signal.

When the control signal 2a refers to the disable state (normal state), the bus control unit 224 does not control the bus, but allows access 9 to pass.

The bus control unit 224 cuts off the bus when the control signal 2a refers to the enable state (access-to-NIC detected state).

When the control signal 7b refers to the disable state (normal state), the bus control unit 224 does not control the bus, but allows data 10 to pass.

When the control signal 7b refers to the enable state (data read state), the bus control unit 224 transmits the held data 8 from the memory unit 223 to the bus.

Figure 18:
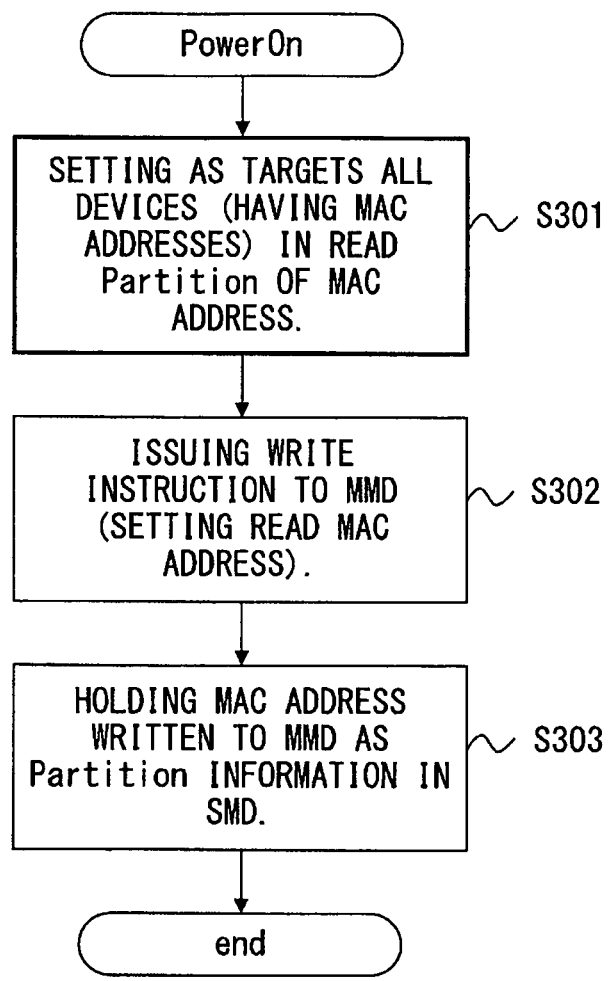
FIG. 18 is a flowchart of the operation of the system management device at power-on according to the first embodiment.

FIG. 18 is a flowchart of the operation of the system management device at power-on according to the first embodiment.

In step S301, the system management device 203 reads the MAC addresses of all devices (NIC in the present embodiment) in the partition 202. The detailed process of the MAC address reading process is described later.

In step S302, the system management device 203 outputs to the MAC address management device 209 the read MAC address and the write instruction of the MAC address. Thus, the MAC address is set in the MAC address management device 209.

In step S303, the system management device 203 holds the MAC address written to the MAC address management device 209 in the system management device 203 as partition information.

Figure 19:
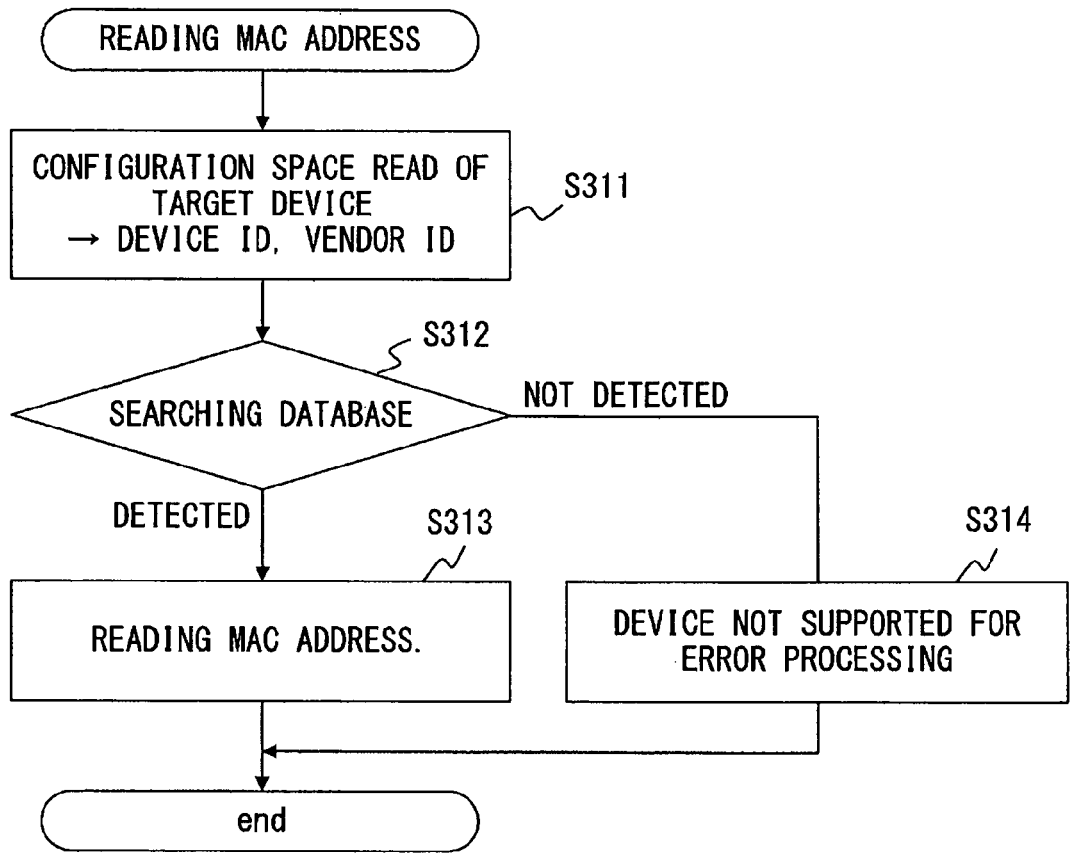
FIG. 19 is a detailed flowchart of reading a MAC address.

FIG. 19 is a detailed flowchart of the MAC address reading process (step S301).

The system management device 203 has a database including a device ID, a vendor ID indicating the manufacturer of the NIC, and a MAC address with their storage locations associated with one another.

In step S311, the system management device 203 reads the configuration space of the target device (NIC) and acquires the device ID and the vendor ID of the target device.

In step S312, the system management device 203 searches a database based on the acquired device ID and vendor ID. When the acquired device ID and vendor ID are detected from the database, control is passed to step S313. If they have not been detected, control is passed to step S314.

In step S313, the system management device 203 can obtain the storage location of the MAC address corresponding to the acquired device ID and vendor ID from the database, and reads the MAC address from the storage location of the MAC address.

In step S314, since the target device is a device not supported yet, the system management device 203 performs error processing.

Described next is the processing of the system management device 203 at the replacement of a device.

Figure 20:
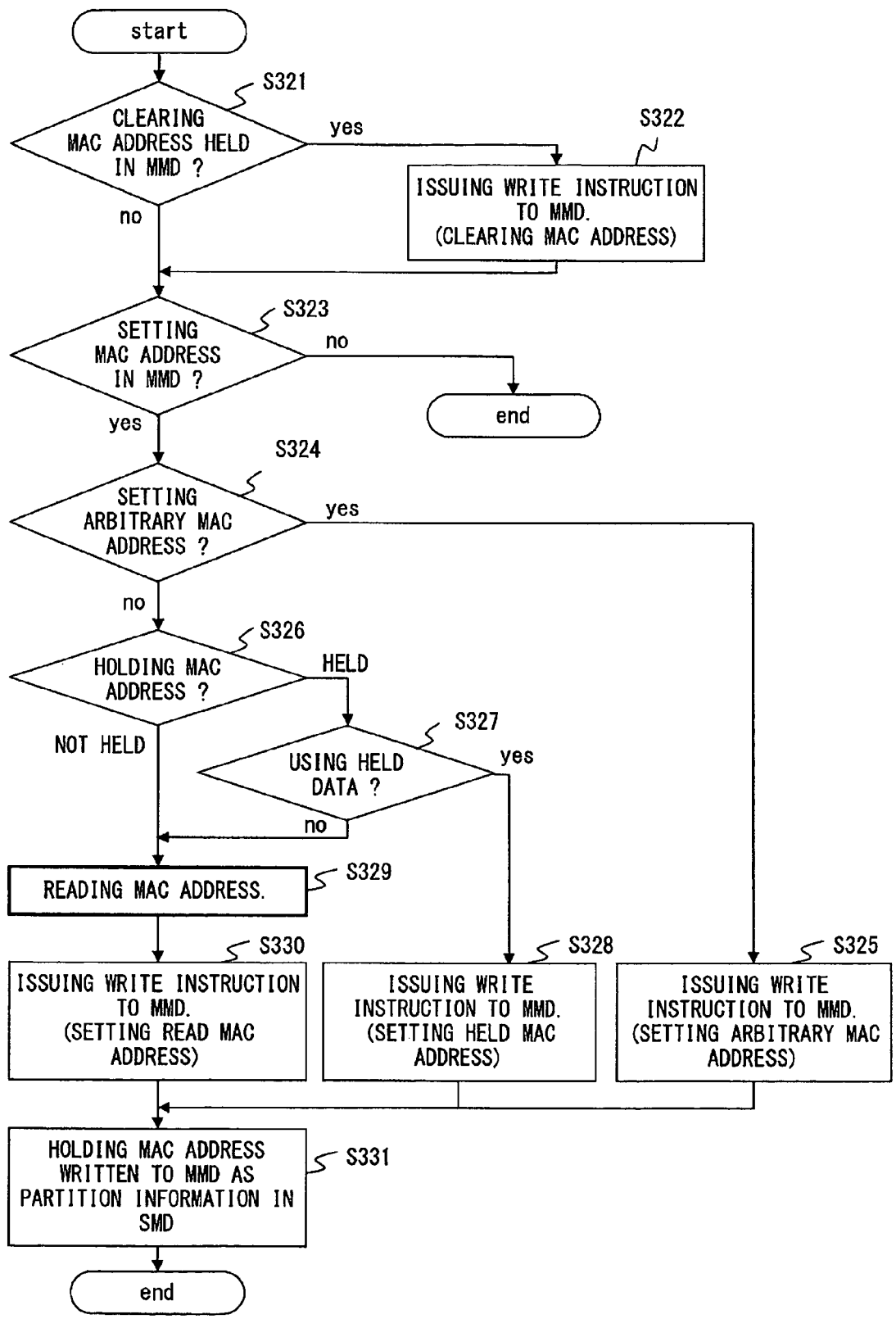
FIG. 20 is a flowchart of the system management device according to the first embodiment when a device is replaced.

FIG. 20 is a flowchart of the system management device when a device is replaced.

In step S321, the system management device 203 determines whether or not the MAC address held by the MAC address management device 209 is to be cleared. When it is to be cleared, control is passed to step S322. If it is not to be cleared, control is passed to step S323.

In step S322, the system management device 203 outputs an instruction to clear the MAC address held by the MAC address management device 209 to the MAC address management device 209.

In step S323, it is determined whether or not a MAC address is to be set in the MAC address management device 209. If it is to be set, control is passed to step S324. If not, the process terminates.

In step S324, the system management device 203 determines whether or not an arbitrary MAC address is to be set in the MAC address management device 209. If the arbitrary MAC address is to be set, control is passed to step S325. If a specific MAC address is to be set, control is passed to step S326.

In step S325, the system management device 203 outputs to the MAC address management device 209 an instruction to write an arbitrary MAC address to the MAC address management device 209.

In step S326, the system management device 203 determines whether or not the MAC address is held in the system management device 203. If it is held, control is passed to step S327. If it has not been held yet, control is passed to step S329.

In step S327, the system management device 203 determines whether or not the held MAC address is to be used. If the held MAC address is to be used, control is passed to step S328. If it is not to be used, control is passed to step S329.

In step S328, the system management device 203 outputs to the MAC address management device 209 a held MAC address and an instruction to write the MAC address. Thus, the MAC address held by the system management device 203 is stored in the MAC address management device 209.

In step S329, the system management device 203 reads the MAC addresses of all devices (NIC in the present embodiment) having the MAC addresses in the partition. The MAC address reading process is described above with reference to FIG. 19.

In step S330, the system management device 203 outputs the read MAC address and an instruction to write the MAC address to the MAC address management device 209. Thus, the MAC address is set in the MAC address management device 209.

In step S331, the system management device 203 holds the MAC address written to the MAC address management device 209 as the partition information in the system management device 203.

Described next is the process on each unit of the MAC address management device.

Figure 21:
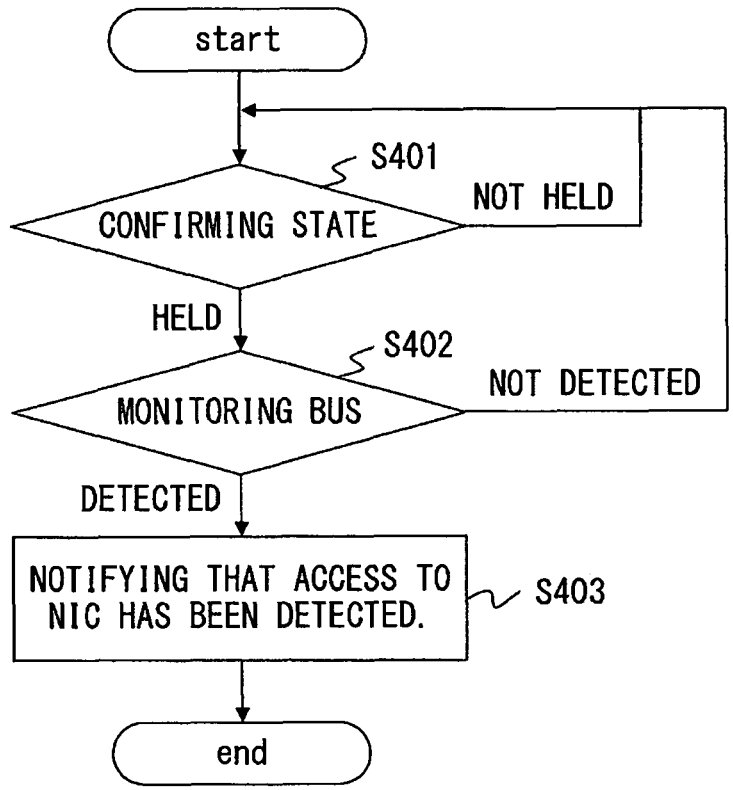
FIG. 21 is a flowchart of the operation of the access detection unit according to the first embodiment.

FIG. 21 is a flowchart of the operation of the access detection unit according to the first embodiment.

In step S401, the access detection unit 221 determines whether or not the MAC address of the target NIC is held with reference to a flag register. When the MAC address is held, control is passed to step S402. If the MAC address has not been held, control is returned to the start.

In step S402, the access detection unit 221 monitors the access to the NIC using the MAC detection data (MAC_REG). When the access to the NIC is detected, control is passed to step S403. If it has not been detected, control is returned to the start.

In step S403, the access detection unit 221 notifies the memory control unit 222 and the bus control unit 224 that the access to the NIC has been detected.

Figure 22:
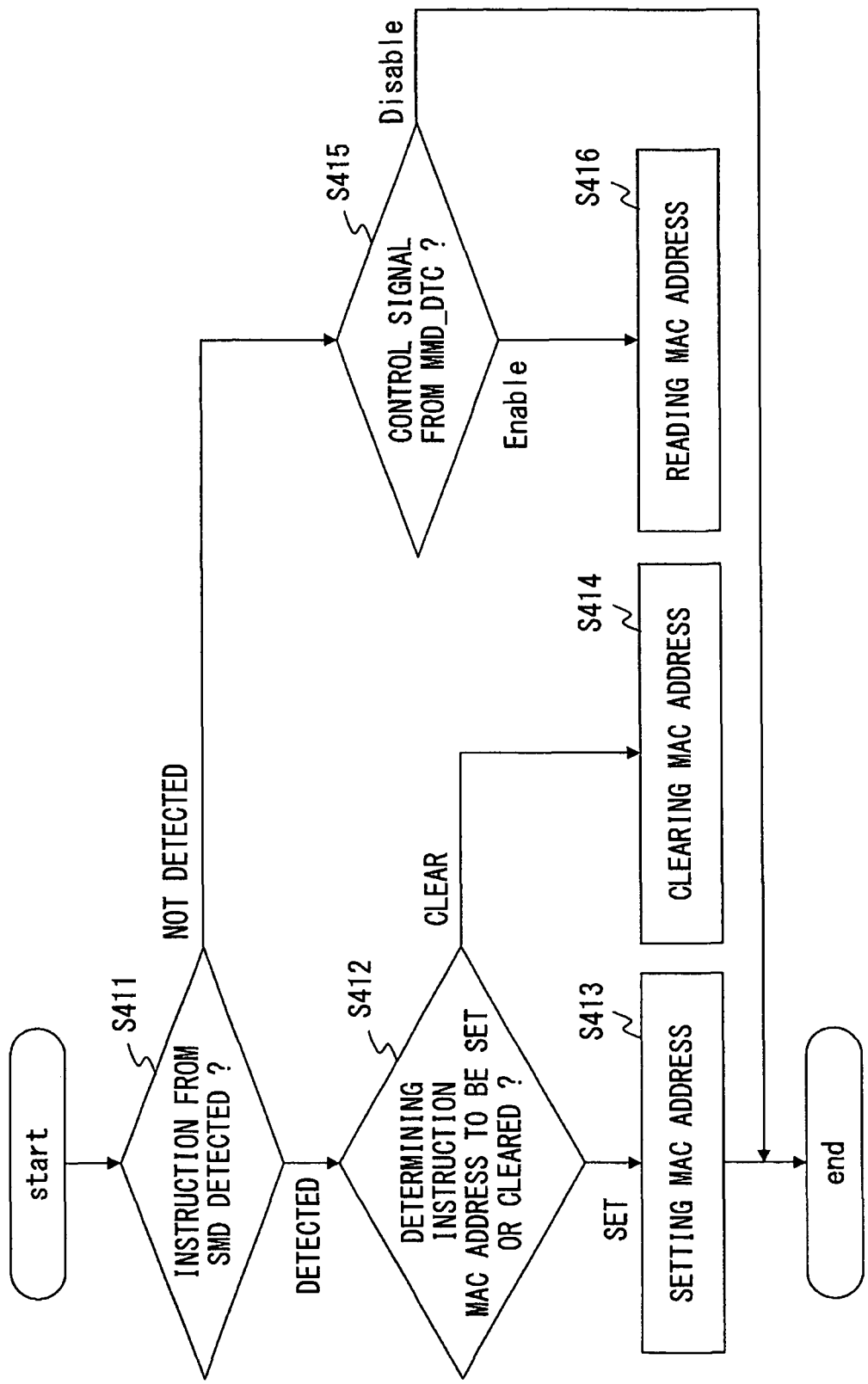
FIG. 22 is a flowchart of the operation of the memory control unit according to the first embodiment.

FIG. 22 is a flowchart of the operation of the memory control unit according to the first embodiment.

In step S411, the memory control unit 222 determines whether or not an instruction from the system management device 203 has been detected. When the instruction is detected, control is passed to step S412. If the instruction has not been detected, control is passed to step S415.

In step S412, the memory control unit 222 determines whether the instruction from the system management device 203 refers to setting a MAC address or clearing the MAC address. When the MAC address is to be set, control is passed to step S413. If the setting of the MAC address is to be cleared, control is passed to step S414.

In step S413, the memory control unit 222 stores an instruction received from the system management device 203 in the control register, and outputs write data and a control signal to the memory unit 223. Furthermore, it outputs MAC detection data and an instruction to set a flag register to the access detection unit 221.

In step S414, the memory control unit 222 stores the instruction received from the system management device 203 in the control register, and outputs an instruction to reset the flag register to the access detection unit 221.

In step S415, the memory control unit 222 determines whether the control signal from the access detection unit 221 is "enable" or "disable". If it refers to "enable", control is passed to step S416. If it refers to "disable", the process terminates.

In step S416, the memory control unit 222 outputs a read control signal to the memory unit 223, and outputs the read control signal to the bus control unit 224.

Figure 23:
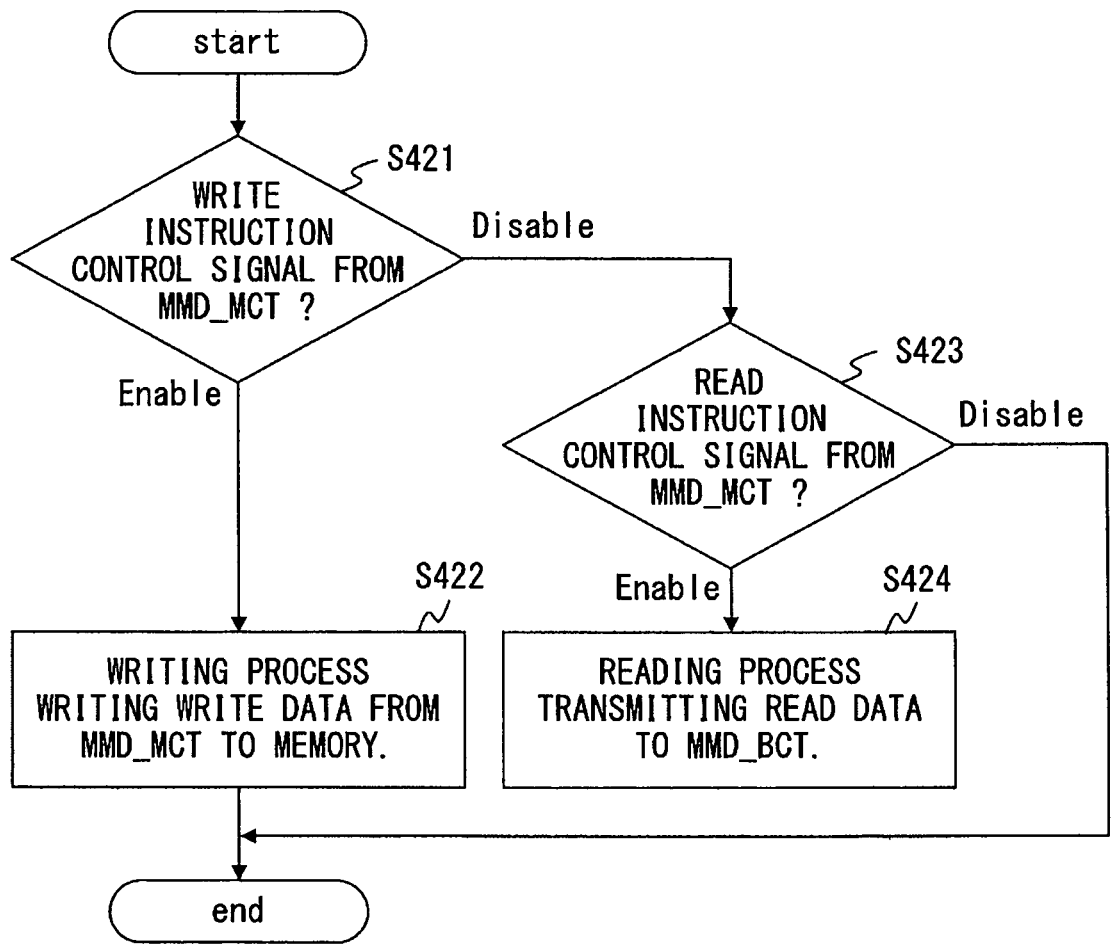
FIG. 23 is a flowchart of the operation of the memory unit according to the first embodiment.

FIG. 23 is a flowchart of the operation of the memory unit according to the first embodiment.

In step S421, the memory unit 223 determines whether the write control signal from the memory control unit 222 is "enable" or "disable". If it refers to "enable", control is passed to step S422. If it refers to "disable", control is passed to step S423.

In step S422, the memory unit 223 writes the write data from the memory control unit 222 to the memory unit 223.

In step S423, the memory unit 223 determines whether the read control signal from the memory control unit 222 is "enable" or "disable". If it refers to "enable", control is passed to step S424. If it refers to "disable", the process terminates.

In step S424, the memory unit 223 outputs a read data to the bus control unit 224.

Figure 24:
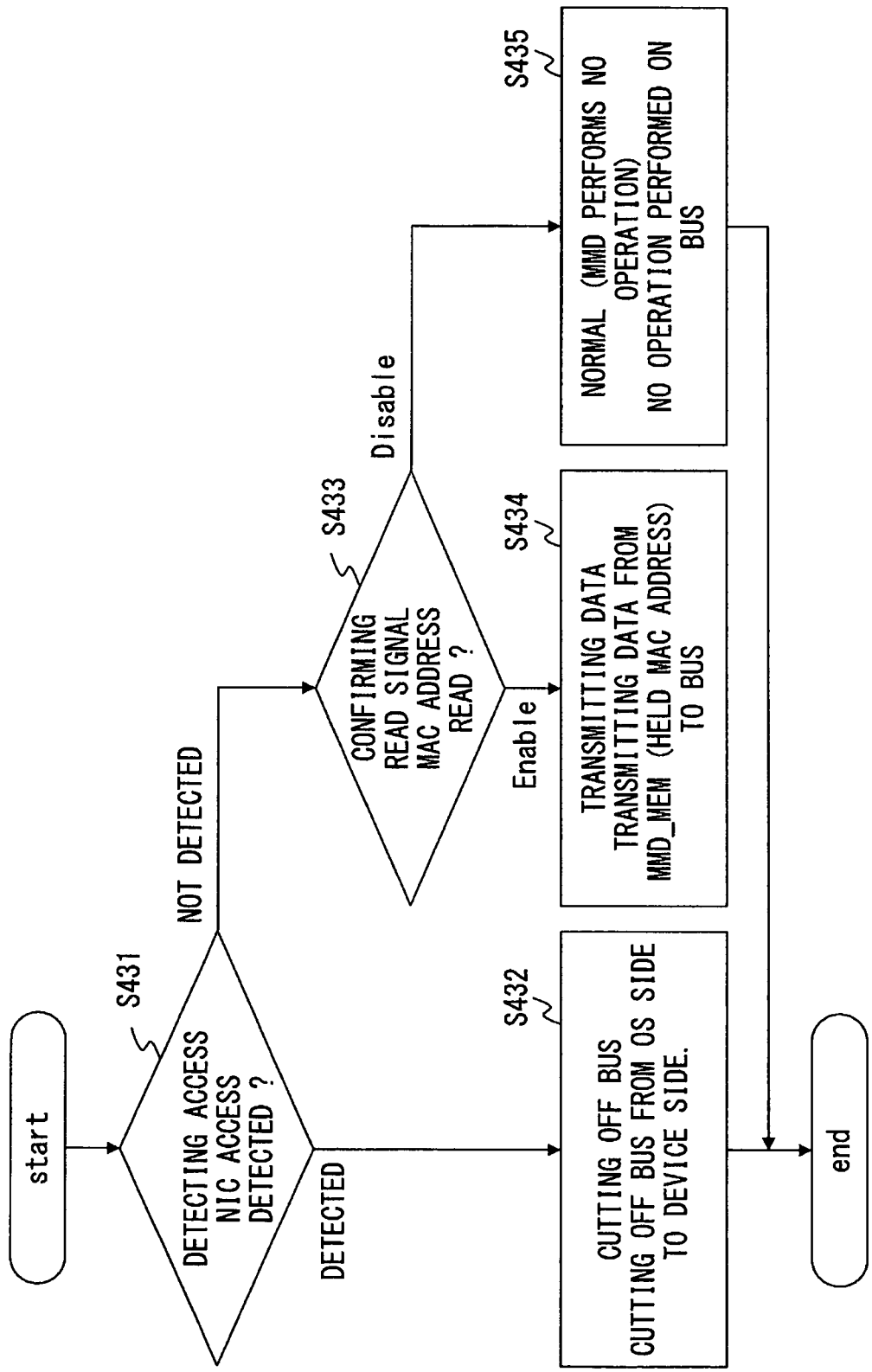
FIG. 24 is a flowchart of the operation of the bus control unit according to the first embodiment.

FIG. 24 is a flowchart of the operation of the bus control unit according to the first embodiment.

In step S431, the bus control unit 224 determines whether or not the access detection unit 221 has detected the access to the NIC. The determination as to the access has been detected is made by determining whether the control signal from the access detection unit 221 is "enable" or "disable". When the access is detected, control is passed to step S432. If it has not been detected, control is passed to step S433.

In step S432, the bus control unit 224 cuts off the access from the OS to the device (NIC).

In step S433, the bus control unit 224 determines whether the read control signal is "enable" or "disable". If it is "enable", control is passed to step S434. If it is "disable", control is passed to step S435.

In step S434, the bus control unit 224 transmits the data (held MAC address) from the memory unit 223 to the bus.

In step S435, the bus control unit 224 does not control the bus.

Described next is the case in which a new MAC address is used after replacing the NIC.

The MAC address management device 209 has the function of clearing the held MAC address. The MAC address can be cleared by the instruction from an external unit (system management device 203 etc.). When the MAC address management device 209 does not hold the MAC address, the NIC is directly accessed. Therefore, the MAC address of a new NIC is available.

Figure 25:
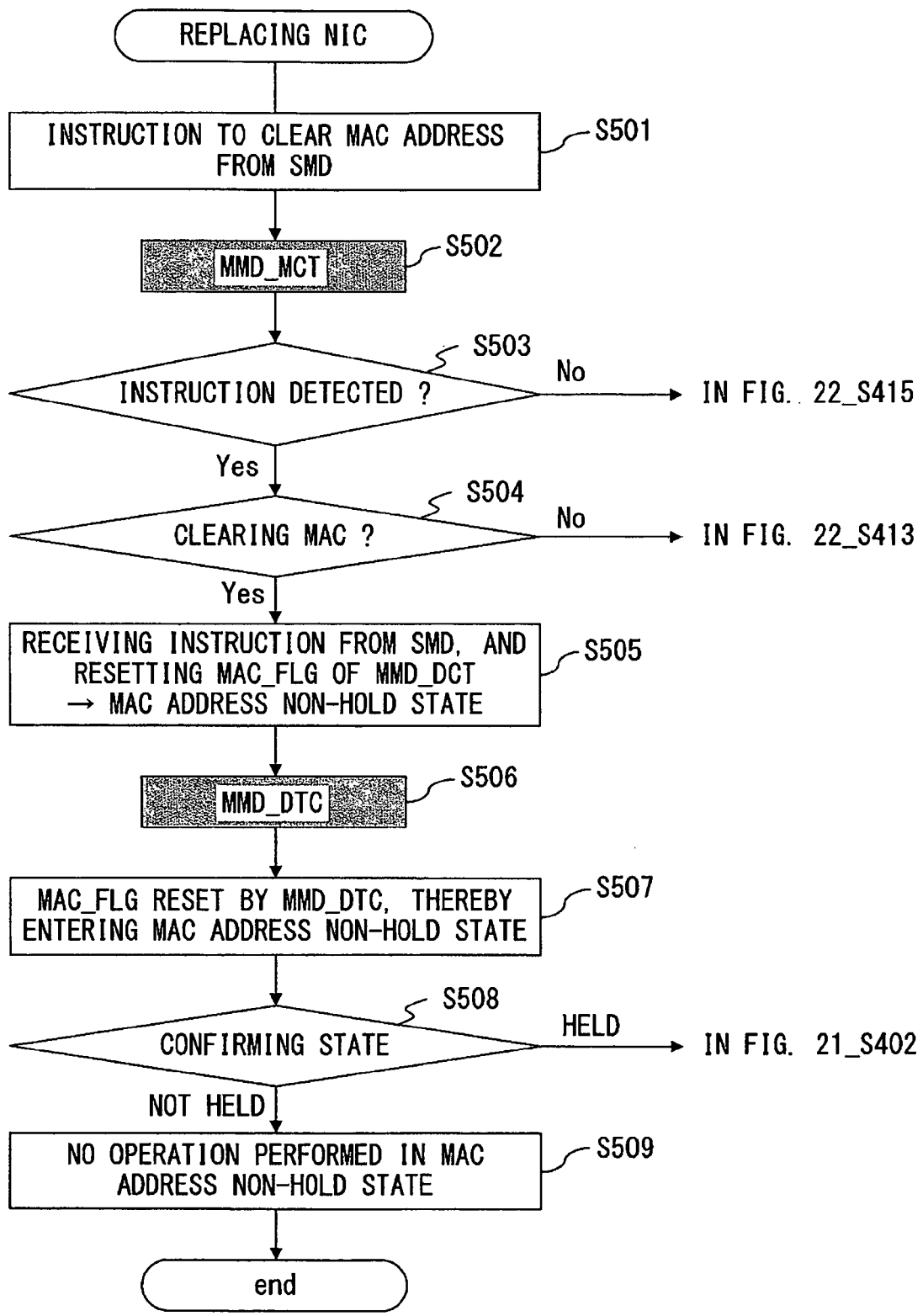
FIG. 25 is a flowchart of the operations of the system management device and the MAC address management device when a new MAC address is used.

FIG. 25 is a flowchart of the operations of the system management device 203 and the MAC address management device when a new MAC address is used.

In step S501, the system management device 203 outputs to the MAC address management device 209 an instruction to clear the MAC address held by the MAC address management device 209.

In step S502, the memory control unit 222 starts the process.

In step S503, the memory control unit 222 determines whether or not an instruction from the system management device 203 has been detected (corresponding to step S411). Since the instruction is detected, control is passed to step S504.

In step S504, the memory control unit 222 determines whether the instruction from the system management device 203 refers to setting a MAC address or clearing the MAC address (corresponding to step S412). Since the instruction refers to clearing the MAC address, control is passed to step S505.

In step S505, the memory control unit 222 stores an instruction received from the system management device 203 in a control register, and outputs an instruction to reset a flag register to the access detection unit 221 (corresponding to step S414). Thus, the MAC address management device 209 enters the MAC address non-hold state in which a MAC address is not held.

In step S506, the process of the access detection unit 221 is started.

In step S507, the access detection unit 221 receives the instruction in step S505, and resets the flag register, thereby entering the MAC address non-hold state.

In step S508, the access detection unit 221 refers to a flag register, and determines whether or not the MAC address of the target NIC is held (corresponding to step S401). As described above, the flag register has been reset, and the MAC address non-hold state has been entered. Therefore, control is passed to step S509.

In step S509, the access detection unit 221 does not perform a specific process on the access from the OS to the NIC.

Thus, since the MAC address management device 209 performs nothing on the access from the OS to the NIC, a MAC address is read from a new NIC.

Therefore, the MAC address of a new NIC is used.

In the first embodiment, an actual MAC address of the NIC is used.

Described below is the flow of the process in the first embodiment from the power-on to the notification to the OS of the MAC address in the MAC address management device.

Figure 26A:
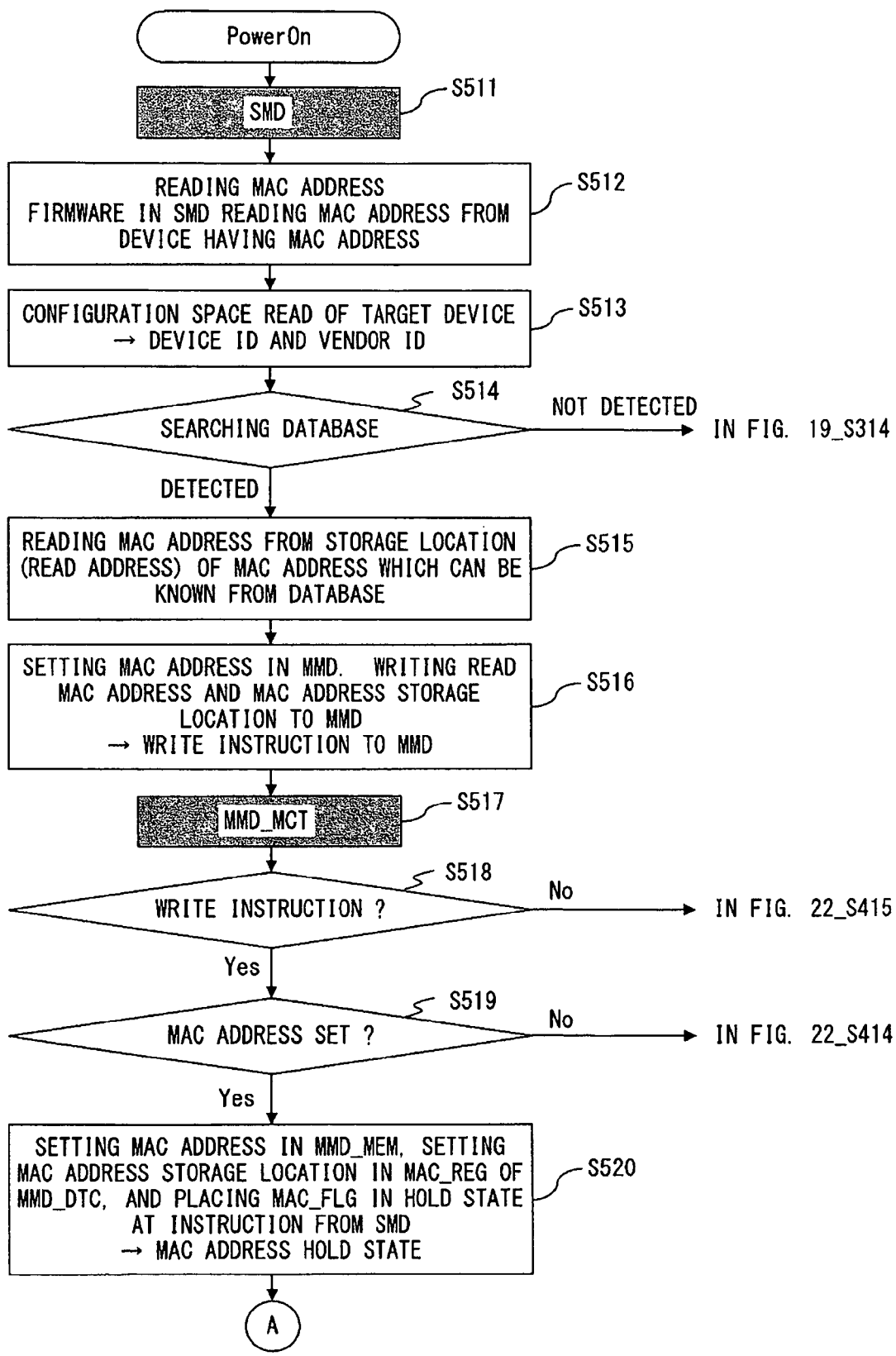
FIG. 26A is a flowchart of the operation of the system management device and the MAC address management device according to the first embodiment.
Figure 26B:
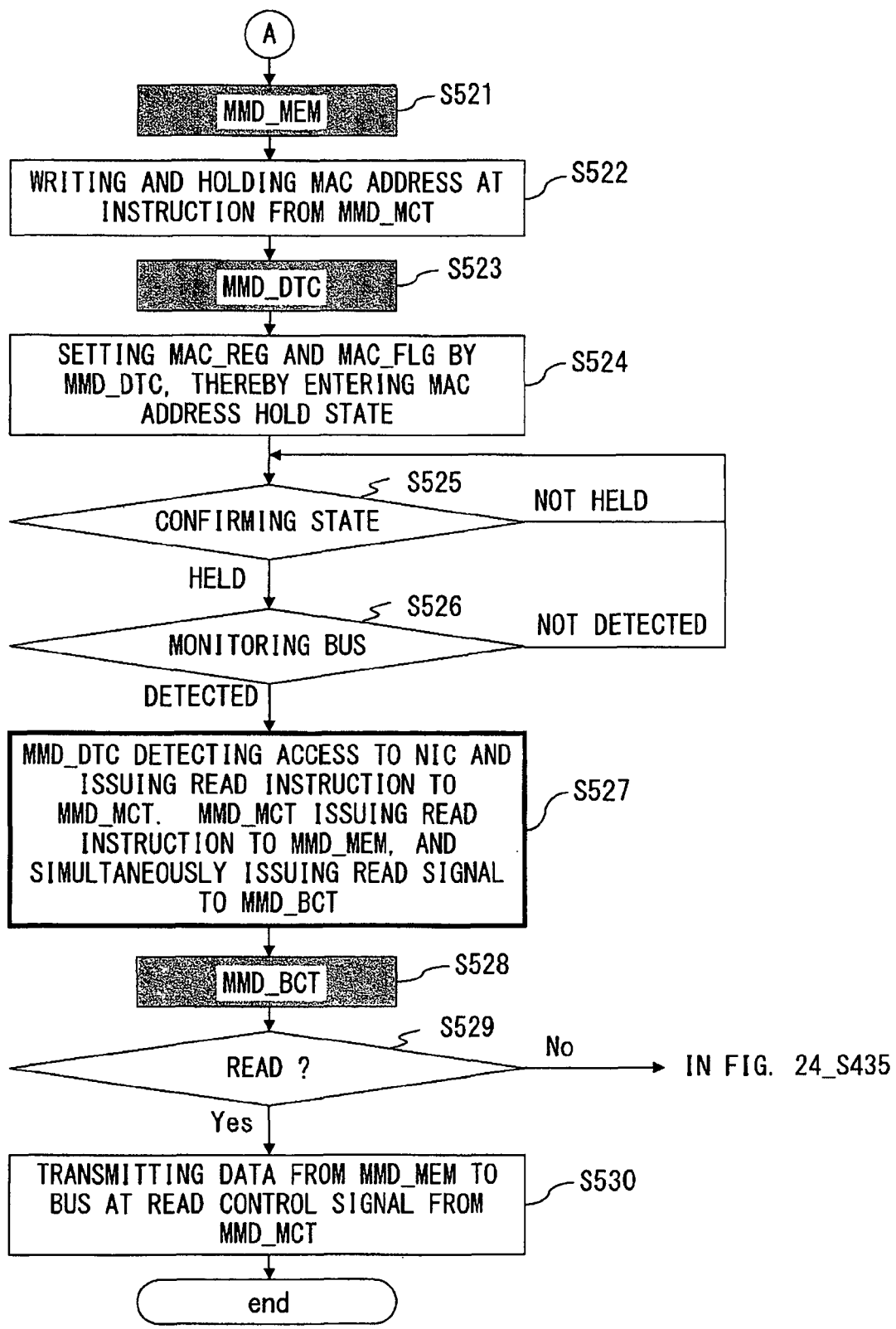
FIG. 26B is a flowchart of the operation of the system management device and the MAC address management device according to the first embodiment.

FIGS. 26A and 26B are flowcharts of the operations of the system management device and the MAC address management device according to the first embodiment.

In the database, the device ID, the vendor ID, and the storage locations of the MAC address on the NIC in the partition are associated with one another and recorded.

In step S511, the system management device 203 starts the process (corresponding to FIGS. 19 and 20).

In step S512, the system management device 203 reads the MAC addresses of all devices (NIC in the present embodiment) having the MAC addresses in the partition (corresponding to step S301).

In step S513, the system management device 203 reads the configuration space of the target device (NIC) and acquires the device ID and the vendor ID of the target device (corresponding to step S311).

In step S514, the system management device 203 searches a database based on the acquired device ID and vendor ID (corresponding to step S312). Then, the corresponding device ID and vendor ID are detected, and control is passed to step S515.

In step S515, the system management device 203 can obtain the storage location of the MAC address of the device corresponding to the acquired device ID and vendor ID from the database, and reads the MAC address from the storage location of the MAC address (corresponding to step S313).

In step S516, the system management device 203 outputs to the MAC address management device 209 the read MAC address and an instruction to write the MAC address. Thus, the setting of the MAC address in the MAC address management device 209 is started (corresponding to step S302).

In step S517, the memory control unit 222 starts the process (corresponding to FIG. 23).

In step S518, the memory control unit 222 determines whether or not the write instruction from the system management device 203 has been detected. Since the write instruction is issued in step S516, the write instruction is detected and control is passed to step S519 (corresponding to step S411).

In step S519, the memory control unit 222 determines whether the instruction from the system management device 203 refers to setting a MAC address or clearing the MAC address. Since the instruction issued in step S516 is to write the MAC address, the unit determines to set the address, and control is passed to step S520 (corresponding to step S412).

In step S520, the memory control unit 222 stores an instruction received from the system management device 203 in the control register, and outputs write data and a control signal to the memory unit. Furthermore, it outputs MAC detection data and an instruction to set a flag register to the access detection unit 221 (corresponding to step S413). Thus, the MAC address hold state is entered.

In step S521, the memory unit starts the process (corresponding to FIG. 24).

In step S522, the memory unit writes the write data (MAC address) from the memory control unit 222 (corresponding to step S422).

In step S523, the access detection unit 221 starts the process (corresponding to FIG. 22).

In step S524, the MAC detection data and the flag register are set in the access detection unit 221, and the MAC address hold state is entered.

In step S525, the access detection unit 221 determines whether or not the MAC address of the target NIC is held with reference to a flag register. Since the hold state is entered as described above in step S520, control is passed to step S526 (corresponding to step S401).

In step S526, the access detection unit 221 monitors the access to the NIC using the MAC detection data (MAC_REG). When the access to the NIC is detected, control is passed to step S527. If it has not been detected, control is returned to S525 (corresponding to step S402).

In step S527, the access detection unit 221 notifies the memory control unit 222 and the bus control unit 224 that the access to the NIC has been detected (corresponding to step S403). In addition, the memory control unit 222 issues a read instruction to the memory unit, and outputs a read signal to the bus control unit.

In step S528, the bus control unit starts the process (corresponding to FIG. 25).

In step S529, the bus control unit determines whether the read control signal is "enable" or "disable". As described above in step S527, since the read signal is "enable", control is passed to step S530 (corresponding to step S433)

In step S530, the bus control unit transmits the data (held MAC address) from the memory unit to the bus (corresponding to step S434).

As described above, in response to the access from the OS to the NIC, the MAC address held by the MAC address management device is reported.

According to the MAC address management device in the first embodiment, when the NIC is replaced, and when the access from the OS to the new NIC is detected, the OS is notified of the MAC address in the NIC before the replacement. Therefore, an information non-matching problem does not occur during the confirmation of the configuration information. Therefore, it is not necessary to preset the OS when the NIC is replaced, thereby improving the maintainability.

Second Embodiment

In the first embodiment, the MAC address set in the MAC address management device is an actual MAC address stored in the NIC. However, in the second embodiment, the MAC address set in the MAC address management device is a virtual MAC address.

Described below is the flow of the process according to the second embodiment from the power-on to the notification to the OS of the virtual MAC address in the MAC address management device.

The configuration of the server according to the second embodiment is similar to the server according to the first embodiment illustrated in FIG. 16.

Figure 27A:
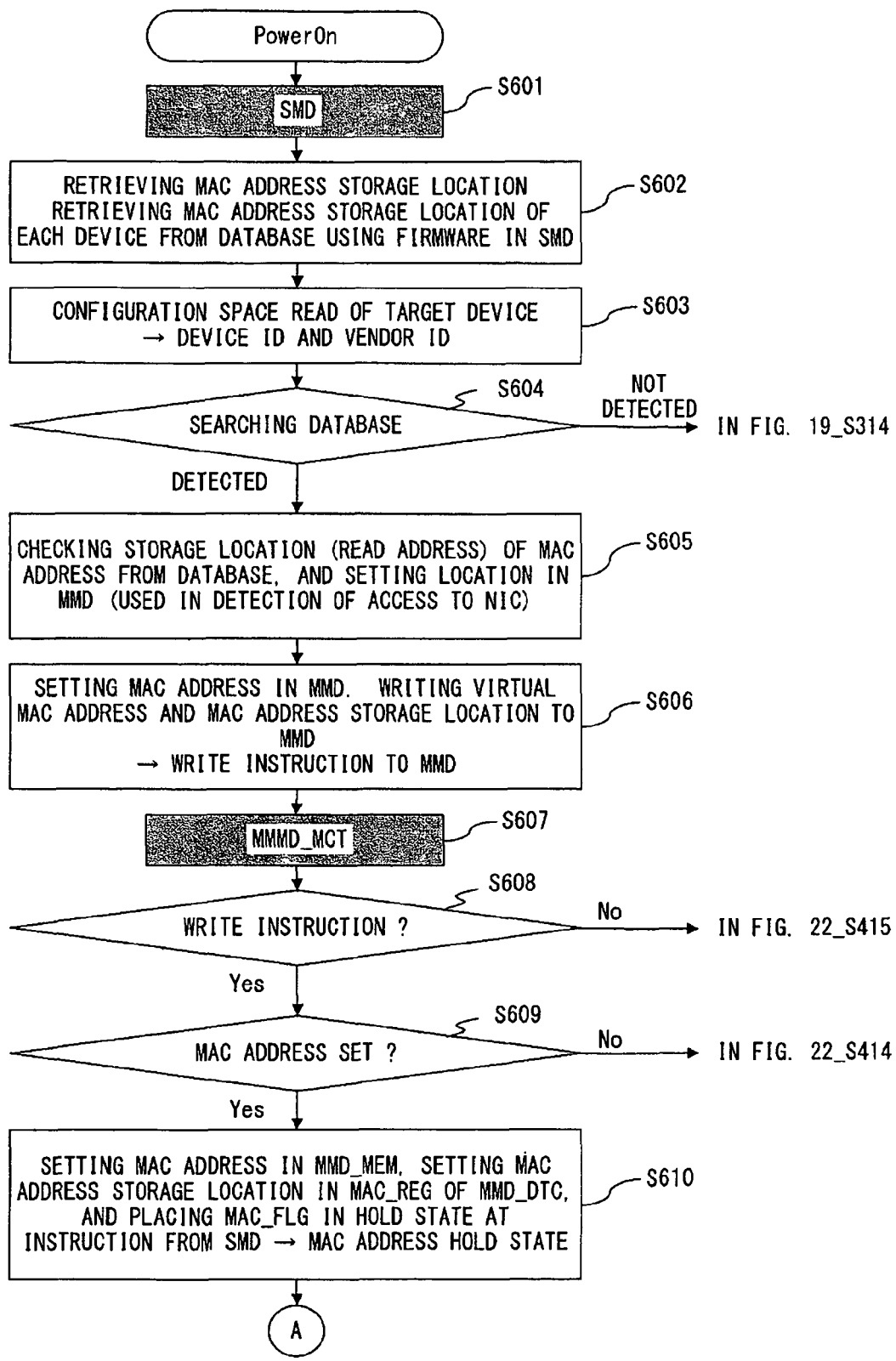
FIG. 27A is a flowchart of the operation of the system management device and the MAC address management device according to the second embodiment.
Figure 27B:
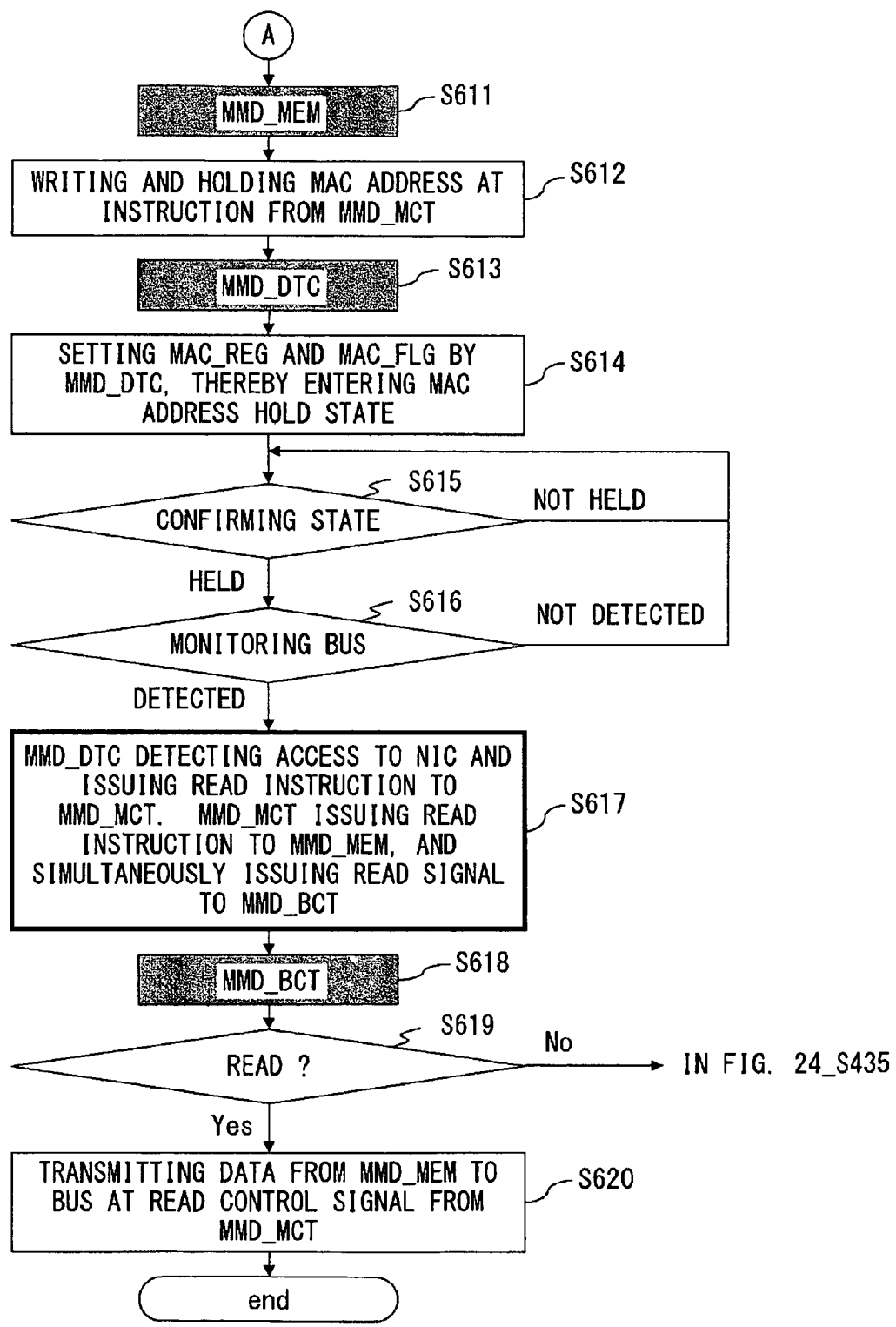
FIG. 27B is a flowchart of the operation of the system management device and the MAC address management device according to the second embodiment.

FIGS. 27A and 27B are flowcharts of the operations of the system management device and the MAC address management device according to the second embodiment.

In step S601, the system management device 203 starts the process.

In step S602, the system management device 203 starts the process of acquiring the storage location of the MAC address of each device in the partition 202.

In step S603, the system management device 203 reads the configuration space of the target device (NIC according to the present embodiment), and acquires the device ID and vendor ID of the target device.

In step S604, the system management device 203 searches the database using the acquired device ID and vendor ID as retrieval keys. Then, the corresponding device ID and vendor ID are retrieved, and control is passed to step S605.

In step S605, the system management device 203 can obtain the storage location of the MAC address of the device corresponding to the retrieved device ID and vendor ID from the database, and sets the storage location of the MAC address in the MAC address management device 209. It is used to detect the access to the NIC.

In step S606, the system management device 203 outputs to the MAC address management device 209 the virtual MAC address and an instruction to write the MAC address. Thus, the virtual MAC address is set in the MAC address management device 209. The virtual address is assigned in advance to a server, and is held by the firmware in the system management device 203.

In step S607, the memory control unit 222 starts the process.

In step S608, the memory control unit 222 determines whether or not the write instruction from the system management device 203 has been detected. Since the write instruction is output in step S606, the write instruction is detected and control is passed to step S609.

In step S609, the memory control unit 222 determines whether the instruction from the system management device 203 refers to setting a MAC address or clearing the MAC address. Since the instruction issued in step S606 is to write the MAC address, the unit determines to set the address, and control is passed to step S610.

In step S610, the memory control unit 222 stores an instruction received from the system management device 203 in the control register, and outputs write data and a control signal to the memory unit. Furthermore, it outputs MAC detection data and an instruction to set a flag register to the access detection unit 221. Thus, the MAC address hold state is entered.

In step S611, the memory unit starts the process.

In step S612, the memory unit writes the write data (MAC address) from the memory control unit 222 to the memory unit.

In step S613, the access detection unit 221 starts the process.

In step S614, the MAC detection data and the flag register are set in the access detection unit 221, and the MAC address hold state is entered.

In step S615, the access detection unit 221 determines whether or not the MAC address of the target NIC is held with reference to a flag register. Since the hold state is entered as described above in step S610, control is passed to step S616.

In step S616, the access detection unit 221 monitors the access to the NIC using the MAC detection data (MAC_REG). When the access to the NIC is detected, control is passed to step S617. If it has not been detected, control is returned to S615.

In step S617, the access detection unit 221 notifies the memory control unit 222 and the bus control unit 224 that the access to the NIC has been detected. In addition, the memory control unit 222 issues a read instruction to the memory unit, and outputs a read signal to the bus control unit.

In step S618, the bus control unit starts the process.

In step S619, the bus control unit determines whether the read control signal is "enable" or "disable". As described above in step S617, since the read signal is "enable", control is passed to step S620.

In step S620, the bus control unit transmits the data (held MAC address) from the memory unit to the bus.

As described above, in response to the access from the OS to the NIC, the MAC address held by the MAC address management device 209 is reported.

According to the MAC address management device in the second embodiment, when the NIC is replaced, and when the access from the OS to the new NIC is detected, the OS is notified of the MAC address in the NIC before the replacement. Therefore, an information non-matching problem does not occur during the confirmation of the configuration information. Therefore, it is not necessary to preset the OS when the NIC is replaced, thereby improving the maintainability.

In addition, by using the MAC address allocated in advance to a server without using the intrinsic MAC address for the NIC, the MAC address can be prevented from being changed by replacing a faulty hardware.

In addition, when faulty hardware is repaired and reused, the MAC address is not double used, thereby realizing easier management.

Third Embodiment

The configuration without a system management device is described below as the third embodiment.

Figure 28:
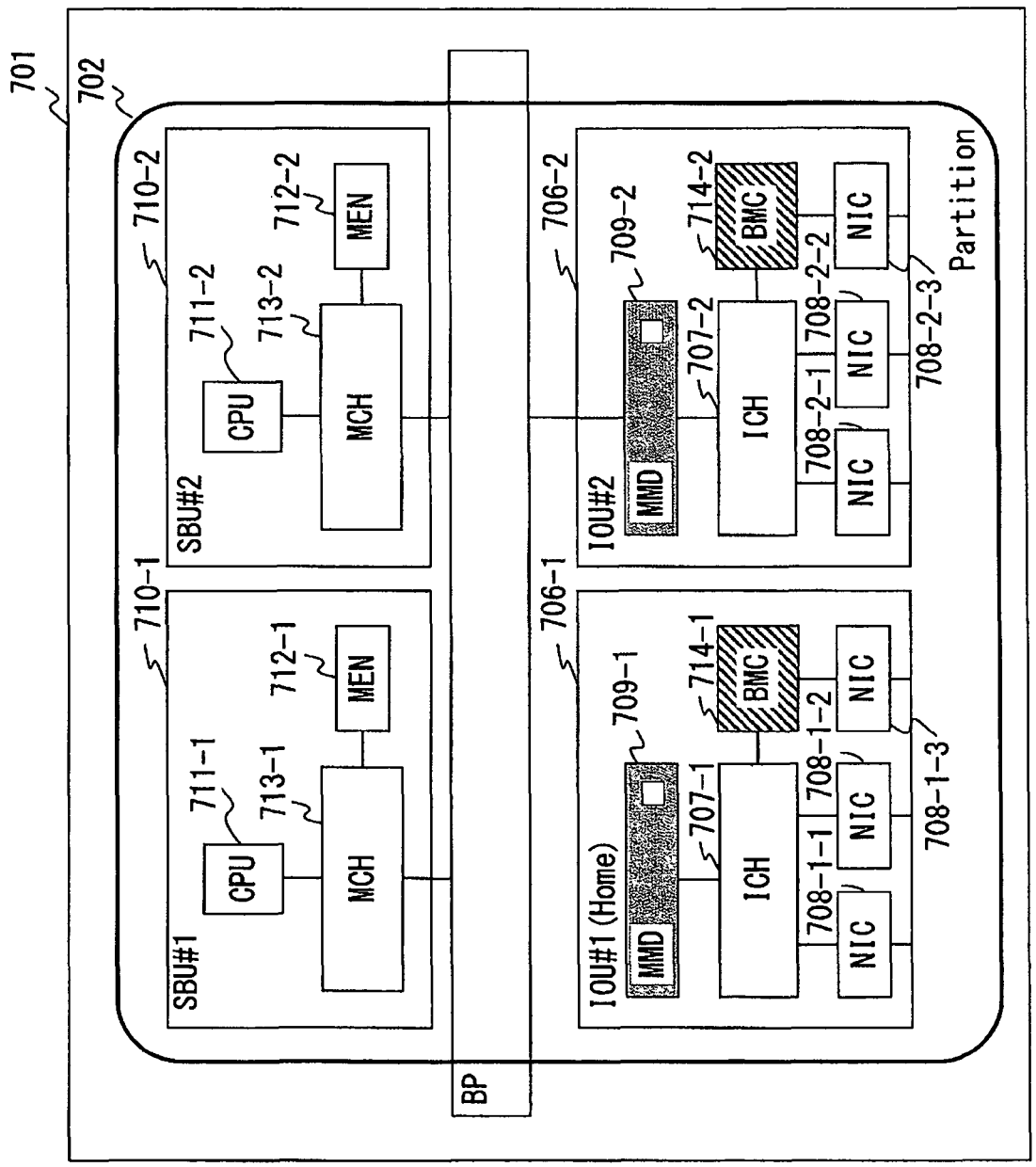
FIG. 28 is a configuration of the server according to the third embodiment.

FIG. 28 is a configuration of the server according to the third embodiment.

A server 701 includes a partition 702 and a BP 704.

The partition 702 includes an IOU 706-$i$ (i=1, 2) and an SBU 710-$i$.

The IOU 706-$i$ includes an ICH 707-$i$, a NIC 708-$i$-$k$ (k=1 through 3), a MAC address management device 709-$i$, and a baseboard management device (BMC) 714-$i$.

A baseboard management device (BMC) controls each device on a board substrate loaded into the device. In this example, it controls an ICH 707, a NIC 708, a MAC address management device (MMD) 709, etc. provided for an IOU 706.

The SBU 710-$i$ includes a CPU 711-$i$, memory 712-$i$, and an MCH 713-$i$.

A CPU 711 performs various processes.

Memory 712 is a storage device for temporarily storing data to be processed by the CPU 711 etc.

An MCH 713 controls the memory 712.

In the third embodiment, the partition information held by the system management device in the first embodiment is held by a baseboard management device 714-1 of an IOU 706-1 as a Home IOU. The Home IOU selects any IOU in the partition to determine which baseboard management device in the partition is to manage the partition, and sets it as the Home IOU. In this example, the IOU 706-1 is set as the Home IOU.

A baseboard management device 714 includes the firmware for management of the partition 702, and the firmware operates each MAC address management device 709-$i$ in the partition 702. That is, the baseboard management device 714 performs processes similar to those of the system management device in the first embodiment.

Furthermore, as an operation to be performed when the Home IOU is replaced due to a fault, a synchronizing process is performed on the baseboard management device 714 of each IOU 706 in the partition 702. It means that the same information is held in each baseboard management device 714. Thus, if there is any IOU 706 loaded with the baseboard management device 714 available in the partition, the reproduction can be realized in case a plurality of units become faulty. The process for this method can be implemented in the firmware in the BMC.

According to the MAC address management device in the third embodiment, when the NIC is replaced, and when the access from the OS to the new NIC is detected, the OS is notified of the MAC address in the NIC before the replacement. Therefore, an information non-matching problem does not occur during the confirmation of the configuration information. Therefore, it is not necessary to preset the OS when the NIC is replaced, thereby improving the maintainability.

In addition by each IOU 706 holding the baseboard management device and performing the synchronizing process, the reproduction can be realized in case a plurality of units become faulty if any IOU 706 is available.

Fourth Embodiment

Described below is the fourth embodiment having no system management device and no baseboard management device in the IOU.

Figure 29:
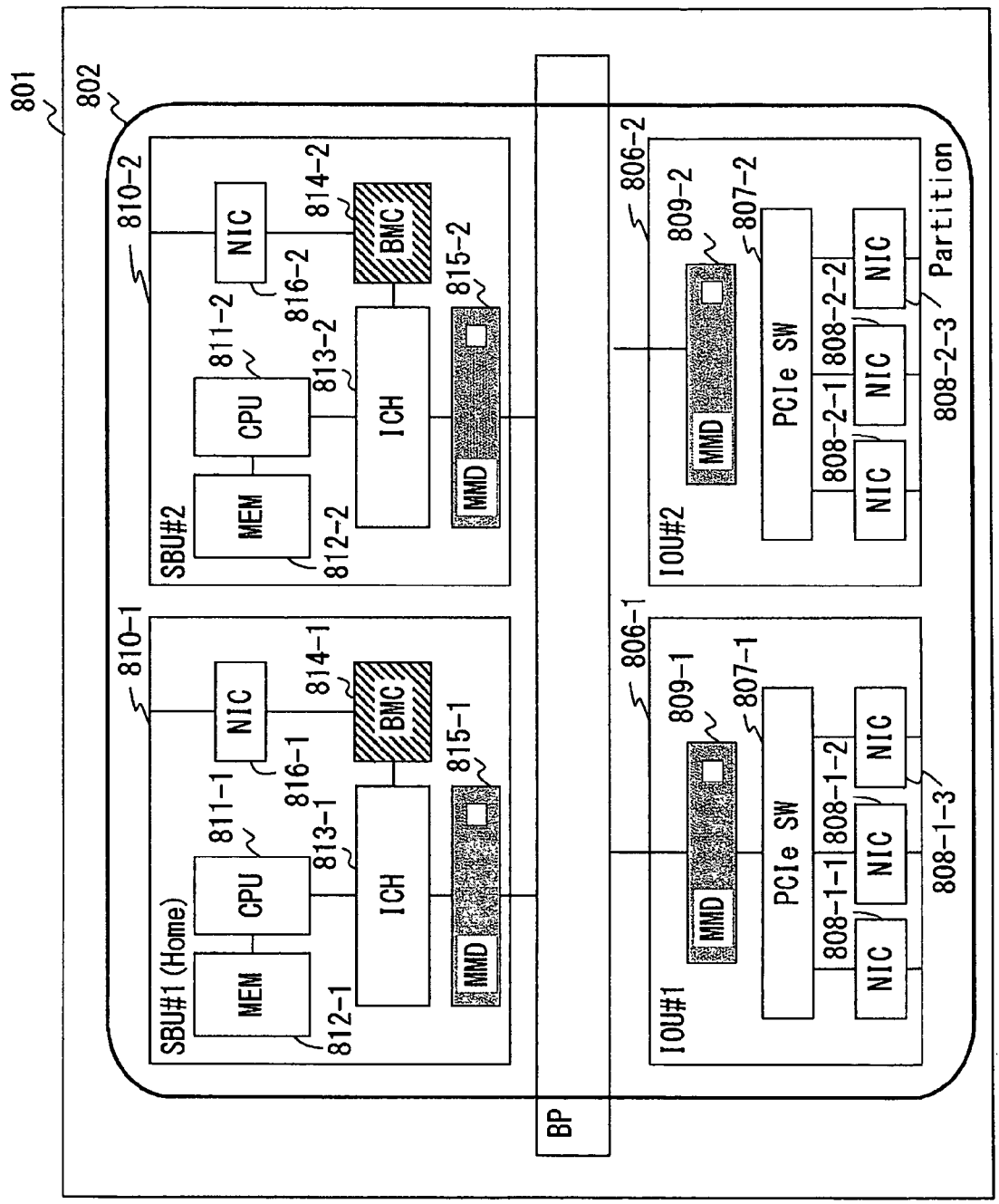
FIG. 29 is a configuration of the server according to the fourth embodiment.

FIG. 29 is a configuration of the server according to the fourth embodiment.

A server 801 includes a partition 802 and a BP 804.

The partition 802 includes an IOU 806-$i$ (i=1, 2) and an SBU 810-$i$.

The IOU 806-$i$ includes a PCIe switch 807-$i$, a NIC 808-$i$-$k$ (k=1 through 3), a MAC address management device (MMD) 809-$i$.

The SBU 810-$i$ includes a CPU 811-$i$, memory 812-$i$, an ICH 813-$i$, a baseboard management device (BMC) 814-$i$, a MAC address management device (MMD) 815-$i$, and a NIC 816-$i$.

In this example, a baseboard management device (BMC) 814 controls a CPU 811, an ICH 813, a MAC address management device (MMD) 815, a NIC 816, etc.

The CPU 811 performs various processes.

Memory 812 is a storage device for temporarily storing data processed by the CPU 811 etc.

The ICH 813 controls the IOU 806.

In the fourth embodiment, the baseboard management device 814 for managing the partition 802 is located in the SBU 810. With the configuration, since the NIC 816 is also included in the SBU 810, the MAC address management device 815 is also loaded into the SBU 810.

In this case, a baseboard management device 814-1 in an SBU 810-1 as a Home SBU holds the partition information, thereby managing the partition 802. That is, the baseboard management device 814-1 performs the process similar to the process of the system management device according to the first embodiment. The Home SBU is set in an SBU in the partition to determine which baseboard management device in the partition is to manage the partition. In this example, the SBU 810-1 is the Home SBU.

As in the third embodiment, the firmware in the baseboard management device 814 operates each of the MAC address management devices 809 and 815. Similarly, the synchronizing process is performed on each baseboard management device 814 in the partition 802, thereby faulty device can be successfully replaced.

According to the MAC address management device in the fourth embodiment, when the NIC is replaced, and when the access from the OS to the new NIC is detected, the OS is notified of the MAC address in the NIC before the replacement. Therefore, an information non-matching problem does not occur during the confirmation of the configuration information. Therefore, it is not necessary to preset the OS when the NIC is replaced, thereby improving the maintainability.

In addition, each SBU 810 holds a baseboard management device to perform the synchronizing process, thereby successfully replacing a faulty device by realizing the reproduction by any SBU 810 available.

Described below as complementary explanation is the outline of the method of accessing the NIC and transmitting data.

Figure 30:
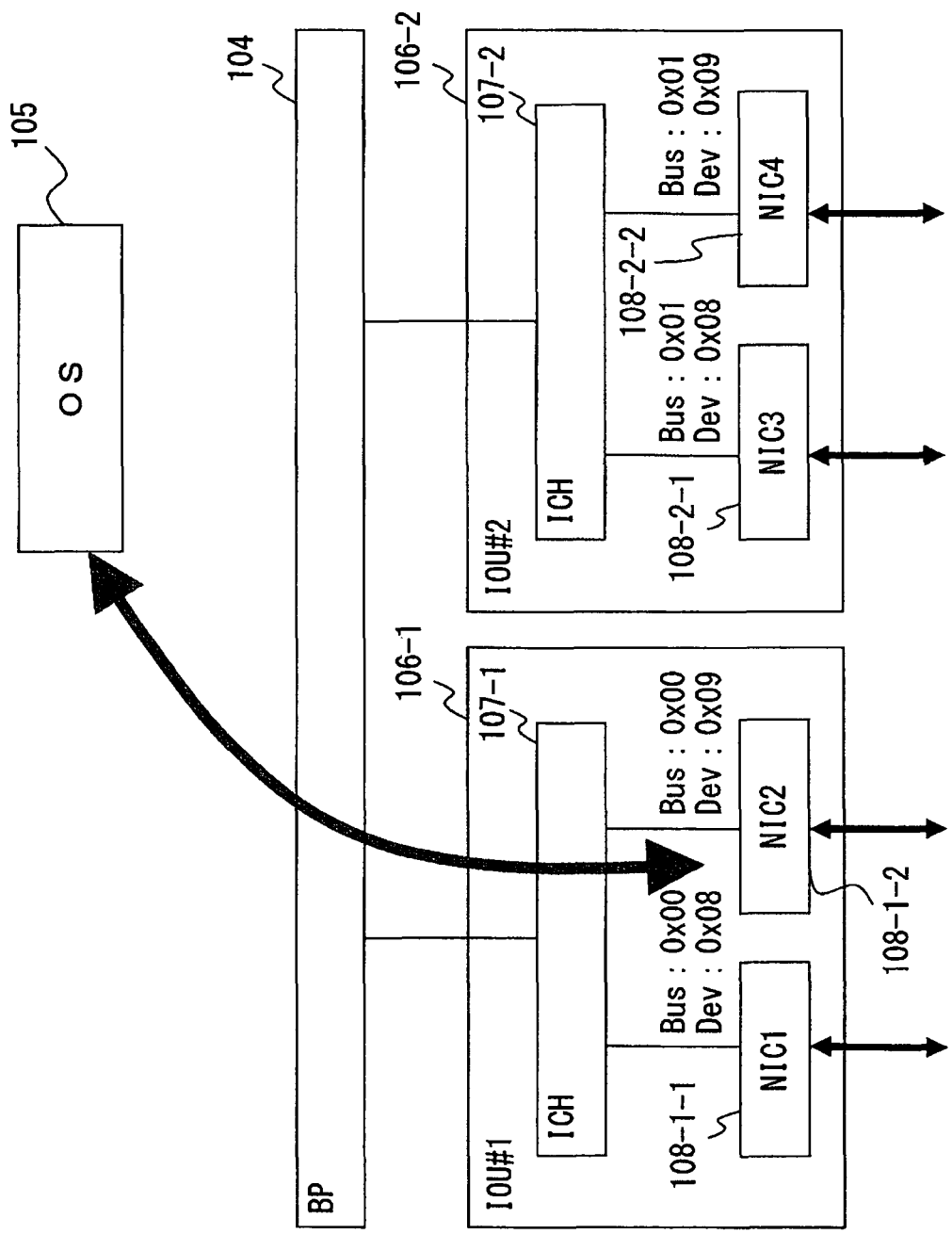
FIG. 30 illustrates the outline of the data transfer between the NIC and the OS.

FIG. 30 illustrates the method of accessing the NIC and transmitting data.

The NIC 208-1-1 is assigned the bus number of 0x00 and the device number of 0x08, the NIC 208-1-2 is assigned the bus number of 0x00 and the device number of 0x09, the NIC 208-2-1 is assigned the bus number of 0x01 and the device number of 0x08, and the NIC 208-2-2 is assigned the bus number of 0x01 and the device number of 0x09.

The access to acquire the MAC address from the OS 205 to the NIC 208, and the communication of data to the NIC 208 for external data transmission are performed using the device path such as a bus number, a device number, etc.

Upon receipt of the data including the MAC address from the OS 205, the NIC 208 generates a packet and externally transmits it.

A device path is fixed and unchanged even after the replacement of a NIC. Therefore, using the device path, a new NIC 208 can be accessed and data can be communicated with the new NIC 208 even after the replacement of the NIC.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A specific identification information management device coupled to a feature expansion device, the specific identification information management device comprising:
    a storage unit to store specific identification information of the feature expansion device;
    a detection circuit to detect an access signal transmitted to the feature expansion device from an operating system to read out specific identification information that the feature expansion device has;
    a control circuit to transmit the specific identification information stored in the storage unit as a response to the access signal to the operating system when the detection circuit detects the access signal to the feature expansion device; and
    a bus control circuit to block the access signal transmitted to the feature expansion device from the operating system to read out the specific identification information that the feature expansion device has when the access signal to the feature expansion device is detected, wherein
    when the feature expansion device is replaced with a different feature expansion device and the detection circuit detects the access signal transmitted to the different feature expansion device from the operating system to read out specific identification information that the different feature expansion device has, the bus control circuit blocks the access signal to read out the specific identification information that the different feature expansion device has, and the control circuit transmits the specific identification information of the feature expansion device stored in the storage unit to the operating system.

2. The specific identification information management device according to claim 1, wherein
    when the storage unit stores the specific identification information and the detection circuit detects the access to the feature expansion device, the control circuit transmits the specific identification information stored in the storage unit.

3. An information processing device comprising:
    a feature expansion device to expand a function;
    a specific identification information management circuit comprising: a storage unit to store specific identification information of the feature expansion device; a detection circuit to detect an access signal transmitted to the feature expansion device from an operating system to read out specific identification information that the feature expansion device has; and a control circuit to transmit the specific identification information stored in the storage unit as a response to the access signal to the operating system when the detection circuit detects the access signal to the feature expansion device;
    a system management circuit to control the specific identification information management circuit; and
    a bus control circuit to block the access signal transmitted to the feature expansion device from the operating system to read out the specific identification information that the feature expansion device has when the access signal to the feature expansion device is detected, wherein
    when the feature expansion device is replaced with a different feature expansion device and the detection circuit detects the access signal transmitted to the different feature expansion device from the operating system to read out specific identification information that the different feature expansion device has, the bus control circuit blocks the access signal to read out the specific identification information that the different feature expansion device has, and the control circuit transmits the specific identification information of the feature expansion device stored in the storage unit to the operating system.

4. The information processing device according to claim 3, wherein
    when the storage unit stores the specific identification information and the detection circuit detects the access to the feature expansion device, the control circuit transmits the specific identification information stored in the storage unit.

5. The information processing device according to claim 3, wherein
    the system management circuit reads the specific identification information of the feature expansion device, and sets the specific identification information in the specific identification information management circuit.

6. The information processing device according to claim 3, wherein
    when the specific identification information management circuit is replaced with another specific identification information management circuit, the system management circuit sets the specific identification information in the another specific identification information management circuit.

7. The information processing device according to claim 3, wherein
the system management circuit sets virtual specific identification information assigned in advance in the specific identification information management circuit.

8. A method for setting specific identification information of a specific identification information management device connected to a feature expansion device, the method comprising:
storing the specific identification information of the feature expansion device in a storage unit of the specific identification information management device;
detecting an access signal transmitted to the feature expansion device from an operating system to read out specific identification information that the feature expansion device has;
blocking the access signal transmitted to the feature expansion device from the operating system to read out the specific identification information that the feature expansion device has when the access signal to the feature expansion device is detected; and
transmitting the specific identification information stored in the storage unit to the operating system as a response to the access signal when the access signal to the feature expansion device is detected, wherein
when the feature expansion device is replaced with a different feature expansion device and the access signal transmitted to the different feature expansion device from the operating system to read out specific identification information that the different feature expansion device has is detected, blocking the access signal to read out the specific identification information that the different feature expansion device has, and transmitting the specific identification information of the feature expansion device stored in the storage unit to the operating system.

* * * * *